United States Patent [19]

O'Toole et al.

[11] Patent Number: 4,569,040

[45] Date of Patent: Feb. 4, 1986

[54] ELECTRONIC SWITCHING SYSTEM HAVING A TIME DIVISION MULTIPLEX SWITCH CONTROLLER ADDRESS BY CENTRAL CONTROL UNIT

[75] Inventors: Anthony J. P. O'Toole, Keyworth; Gordon P. Boot, Cotgrave, both of England

[73] Assignee: Plessey Overseas Limited, Ilford, England

[21] Appl. No.: 571,442

[22] Filed: Jan. 17, 1984

[30] Foreign Application Priority Data

Jan. 18, 1983 [GB] United Kingdom ............... 8301325
Jan. 18, 1983 [GB] United Kingdom ............... 8301326

[51] Int. Cl.[4] .................... H04Q 11/04; H04J 3/12
[52] U.S. Cl. .................................... 370/58; 370/66; 370/85; 370/110.1
[58] Field of Search .............. 370/58, 67, 66, 110.1, 370/85; 179/18 ES

[56] References Cited

U.S. PATENT DOCUMENTS 3,996,566 12/1976 Moran ................................. 370/67
4,187,399 2/1980 Mayfield et al. .................... 370/58
4,408,323 10/1983 Montgomery ...................... 370/58
4,430,733 2/1984 Hardy et al. ....................... 370/66

Primary Examiner—Douglas W. Olms
Assistant Examiner—Curtis Kuntz
Attorney, Agent, or Firm—Fleit, Jacobson, Cohn & Price

[57] ABSTRACT

A control system for a time division multiplex digital switching exchange has a number of telephony groups located on separate shelves which are interconnected by an intershelf bus. The intershelf bus comprises two address buses and a data bus. A common control computer inserts addressing data into two registers in a digital switch controller (DSC) which uses that data to control the transfer of data between telephony groups by way of the intershelf bus. The DSC also includes transmit and receive registers connected to the data bus which allows the transfer of data to and from the shelves and the common control computer. Should the common control computer require to read data from the DSC it addresses the DSC as one of the shelves (i.e., inserts the address of the DSC in the two registers of the DSC) to cause the DSC to transfer or read data to or from the transmit and receive register.

8 Claims, 58 Drawing Figures

| | |
|---|---|
| FIG. 4A-6. | FIG. 4A-12 |
| FIG. 4A-5. | FIG. 4A-11 |
| FIG. 4A-4. | FIG. 4A-10 |
| FIG. 4A-3. | FIG. 4A-9 |
| FIG. 4A-2. | FIG. 4A-8 |
| FIG. 4A-1. | FIG. 4A-7 |

FIG. 4A.

| FIG. 4B-1. | FIG. 4B-2. | FIG. 4B-3. | FIG. 4B-4. | FIG. 4B-5. |
|---|---|---|---|---|
| FIG. 4B-6. | FIG. 4B-7. | FIG. 4B-8. | FIG. 4B-9. | FIG. 4B-10. |

FIG. 4B.

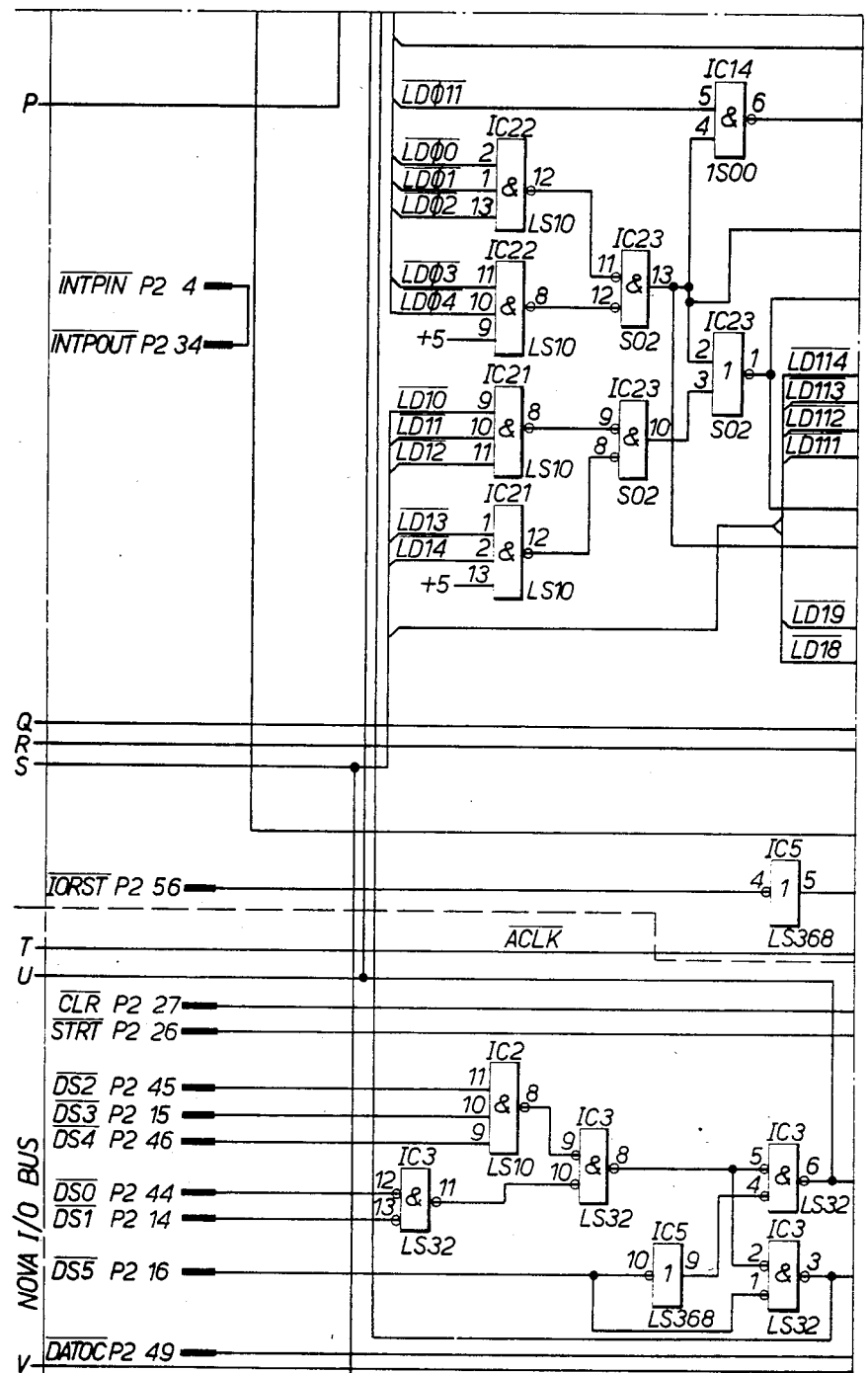
FIG. 4B-6.   DS OR DEVICE SELECT LOGIC 60₈ OR 61₈

| FIG.13A. | FIG.13B. | FIG.13C. | FIG.13D. | FIG.13E. |
|---|---|---|---|---|
| FIG.13F. | FIG.13G. | FIG.13H. | FIG.13I. | FIG.13J. |
| FIG.13K. | FIG.13L. | FIG.13M. | FIG.13N. | FIG.13O. |

FIG. 13.

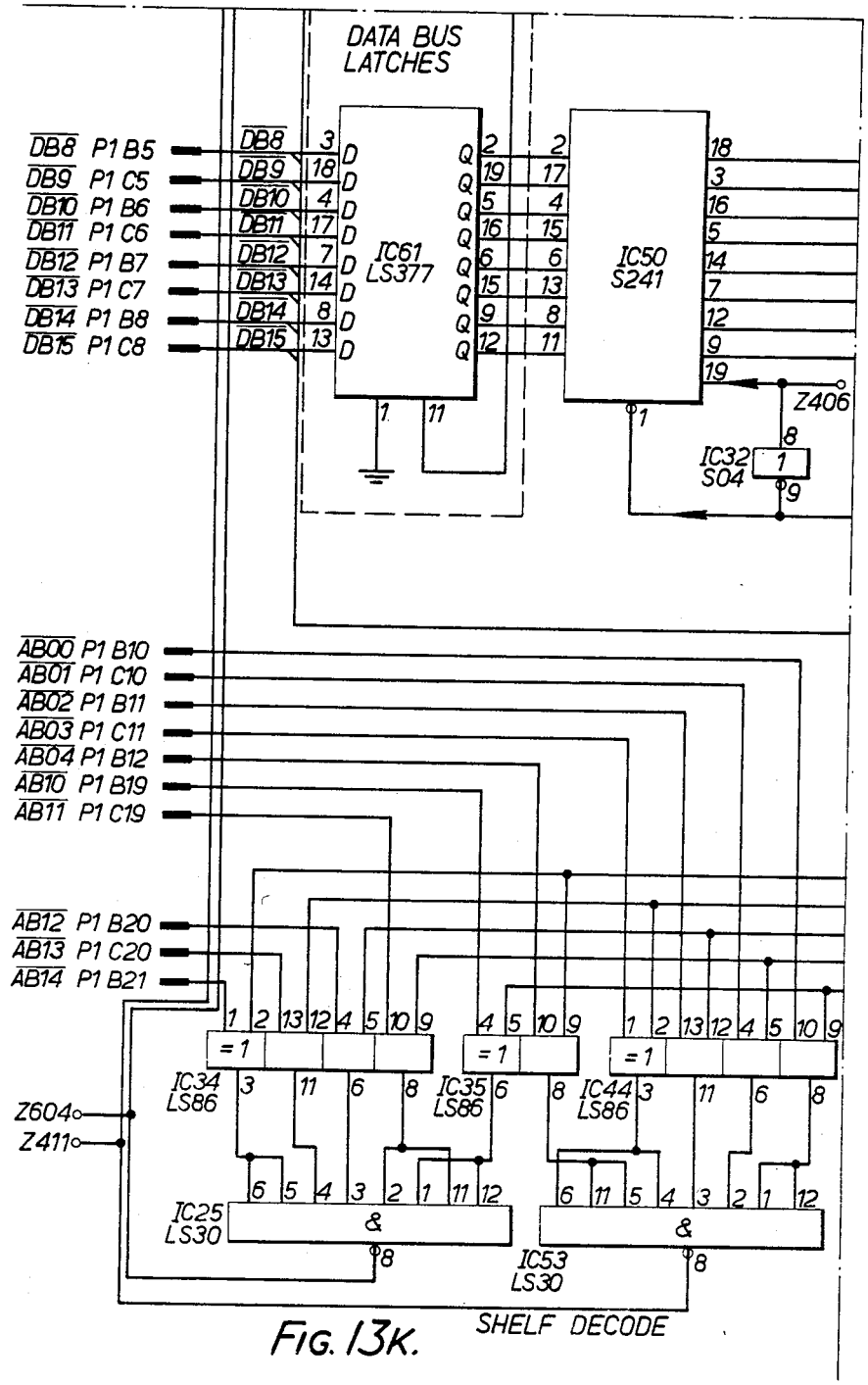
FIG. 13K. SHELF DECODE

TABLE 1 ADDRESS COMMAND STRUCTURE

| BAB | 10 | 11 | 12 | 13 | 14 | 15 | |
|---|---|---|---|---|---|---|---|
| | 0 | X | X | X | X | 1 | TRANSMIT CH 1-16 ONLY |
| | 0 | X | X | X | X | 0 | RECEIVE ONLY CH 1-16 (NOT CODEC) TRANSCEIVE CH 1-16 (CODEC) |
| | 1 | 1 | 1 | 1 | 1 | 0 | UP |
| | 1 | 1 | 1 | 1 | 1 | 1 | DOWN |
| | 1 | 1 | 1 | 1 | 0 | 0 | TK TRANSMIT UPPER FUTURE USE |
| | 1 | 1 | 1 | 1 | 0 | 1 | TK TRANSMIT LOWER |
| | 1<br>1 | 0<br>1 | 0 TO 1 | 0<br>0 | 0<br>1 | 1<br>1 | FUTURE USE TRANSMIT ONLY CH 17-30 |
| | 1<br>1 | 0<br>1 | 0 TO 1 | 0<br>0 | 0<br>1 | 0<br>0 | FUTURE USE RECEIVE CH 17-30 |

ON EXTENSION INTERFACE TRANSMIT COMMAND

0 = OFFHOOK SUMMARY BITS

1 = EARTH BUTTON SUMMARY BITS

NOTE: HARDWARE IMPLEMENTATION IS ACTIVE LOW THUS LOW = 1 AND HIGH = 0

ELECTRONIC SWITCHING SYSTEM HAVING A TIME DIVISION MULTIPLEX SWITCH CONTROLLER ADDRESS BY CENTRAL CONTROL UNIT

FIELD OF INVENTION

The present invention relates to electronic switching systems for telecommunication exchanges and more particularly to time division multiplex (TDM) address and control systems for the control of the passage of data along highways in the system.

SUMMARY OF THE INVENTION

According to the present invention there is provided a time division multiplex address and controller system for a telecommunication exchange, said control system comprising a time division multiplex digital switch controller, a common control computer, a plurality of shelves of equipment containing telephony groups, in which the time division multiplex digital switch control is addressed by the computer as one of said shelves of equipment to insert control information into said time division multiplex switch controller to control the passage of information in between the shelves and between the shelves the common control computer.

BRIEF DESCRIPTION OF THE DRAWINGS

Embodiments of the present invention will now be described by way of example with reference to the accompanying drawings in which.

DESCRIPTION OF THE PREFERRED EMBODIMENT

Figure 1:
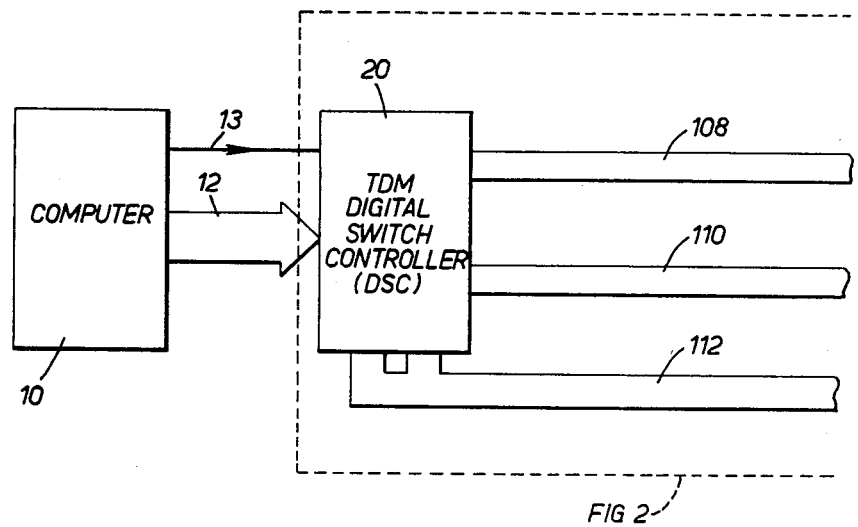
FIG. 1 shows the position of the digital switch controller (DSC) in a typical system such as described in our co-pending British patent application No.: 8323782.
Figure 2:
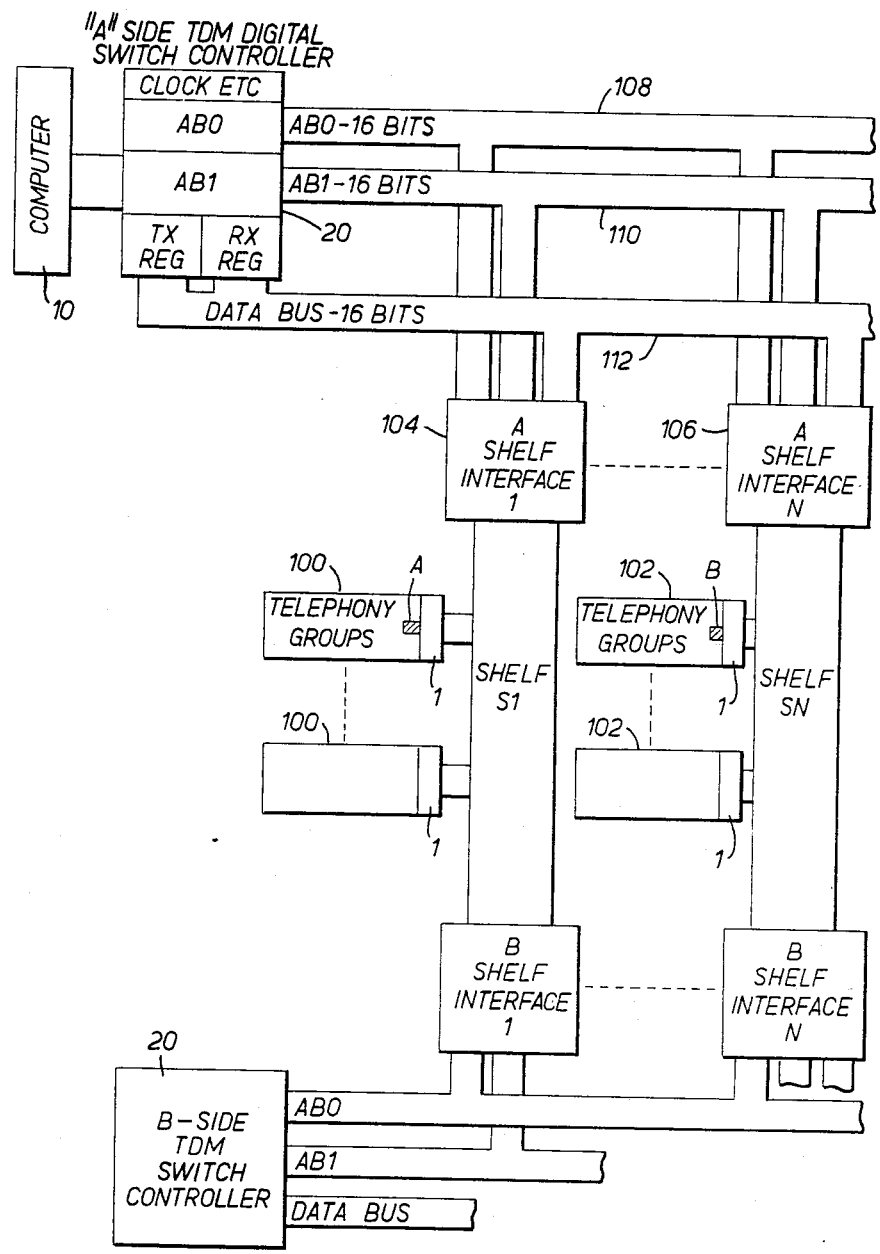
FIG. 2 shows the digital switch controller connected into a typical electronic switching system such as described in our co-pending British application No.: 8323782.

With reference to FIGS. 1 and 2, the computer 10 issues instructions to the controller 20 along bus 12. The controller 20 may for example be connected into a digital telecommunication exchange as described in the above co-pending patent application. The operation of the controller 20 will be so described by way of example.

In operation the computer inserts two addresses in a connection table in the controller 20. One is the address of the card to transmit the information and can go in AB0 or AB1 and the other is the address of the receive register in the controller. This causes information to be passed from a card in the system to the receive register so that the information is readable by the computer 10.

The controller (DSC) interfaces signals between the computer bus 12 and the Intershelf bus (108, 110, 112) in a manner illustrated by the timing diagrams of FIGS. 5 to 10. Where signal codes are given in this specification such as for example DS60 these refer to codes allocated by Data General for their Nova computer range.

The DSC 20 communicates with the Computer 10 via a 16 bit DATA 0-15 bus (12) and with the telephony group shelves along the intershelf bus, ISB, via three sixteen bit buses i.e. AB0 1-15, AB1 1-15 and DB0-15, buses 108, 110, 112—FIG. 2.

A command word is received along the DATA 0-15 bus 12 from the computer 10 and inserted into the correct time slot and onto the correct address bus in the connection table as signified by the computer. Data is also received and transmitted along the DATA 0-15 bus on the common control shelf and along the DB0-15 on the ISB 112.

Other facilities available are a Read Opposite Bus command where an address bus output can be read back to the computer, and Release Bus command which causes all telephony groups 100 to stop transmitting DATA along the TDM shelves.

Figures 1, 4A:
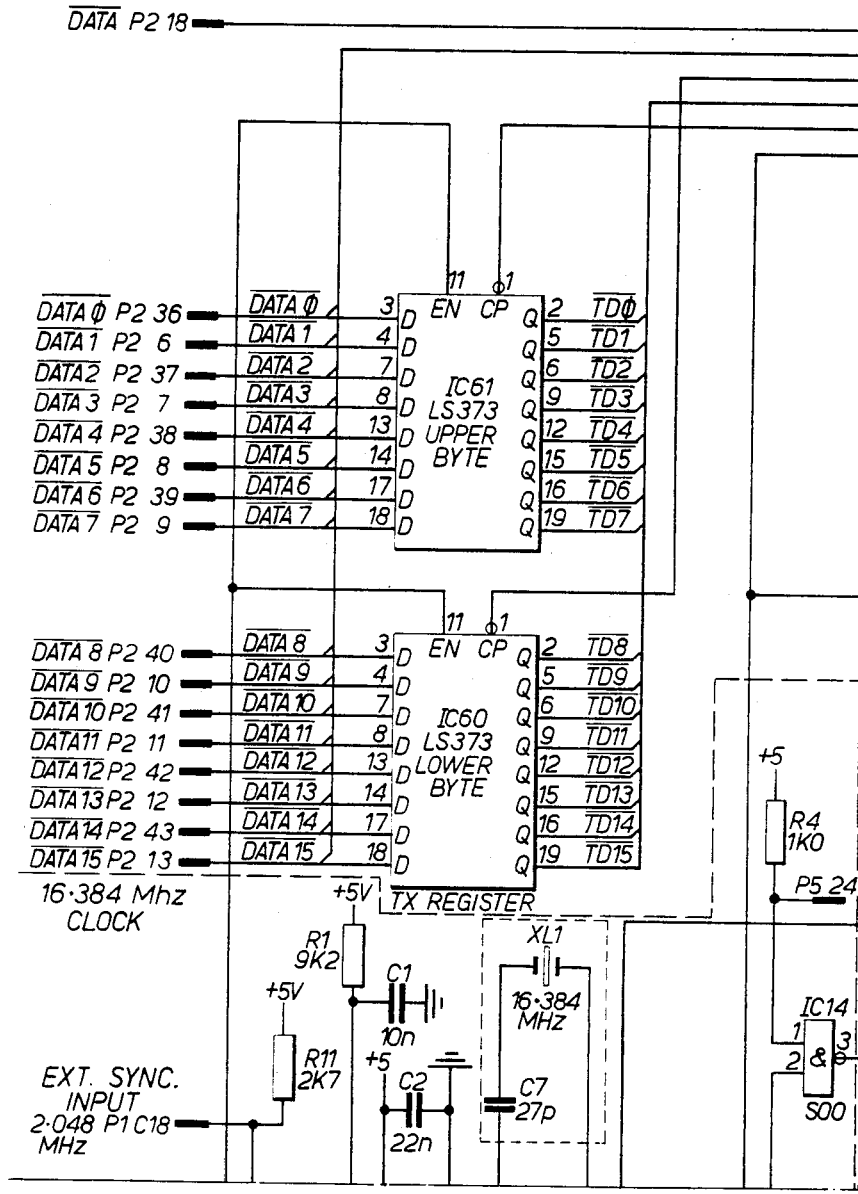
FIGS. 4A and 4B, show a circuit diagram of the DSC.
Figures 2, 4A:
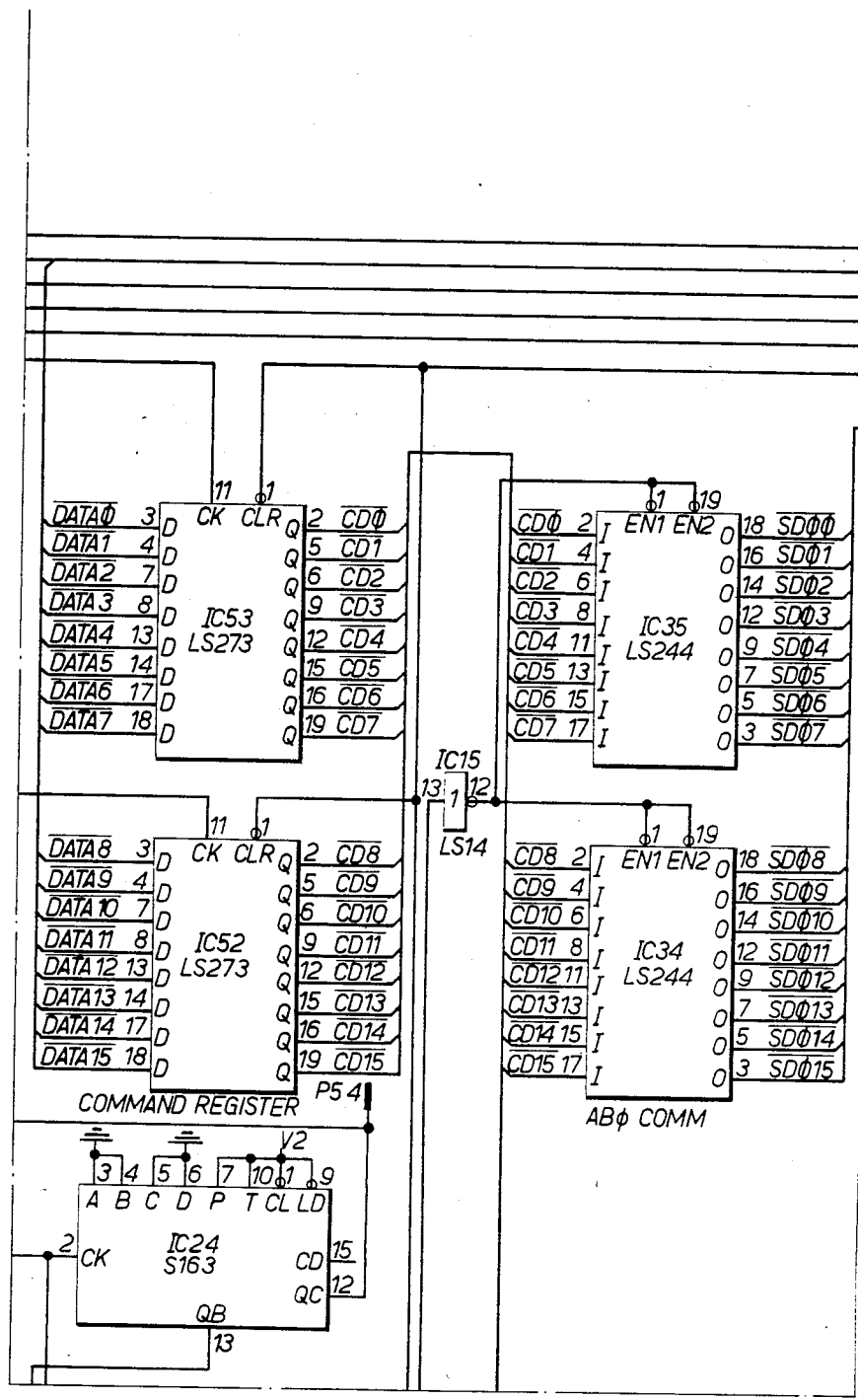
Figures 3, 4A:
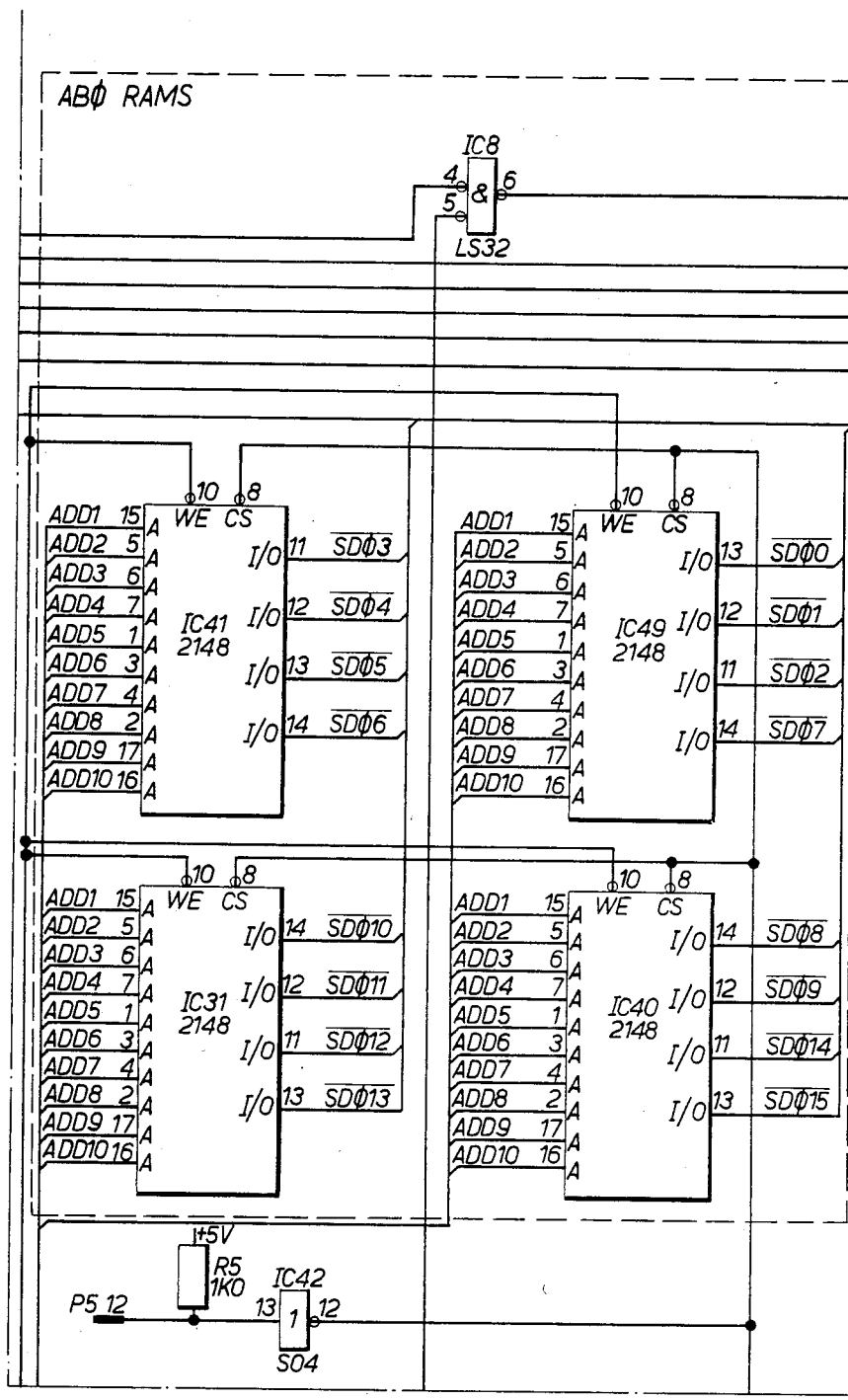
Figures 4, 4A:
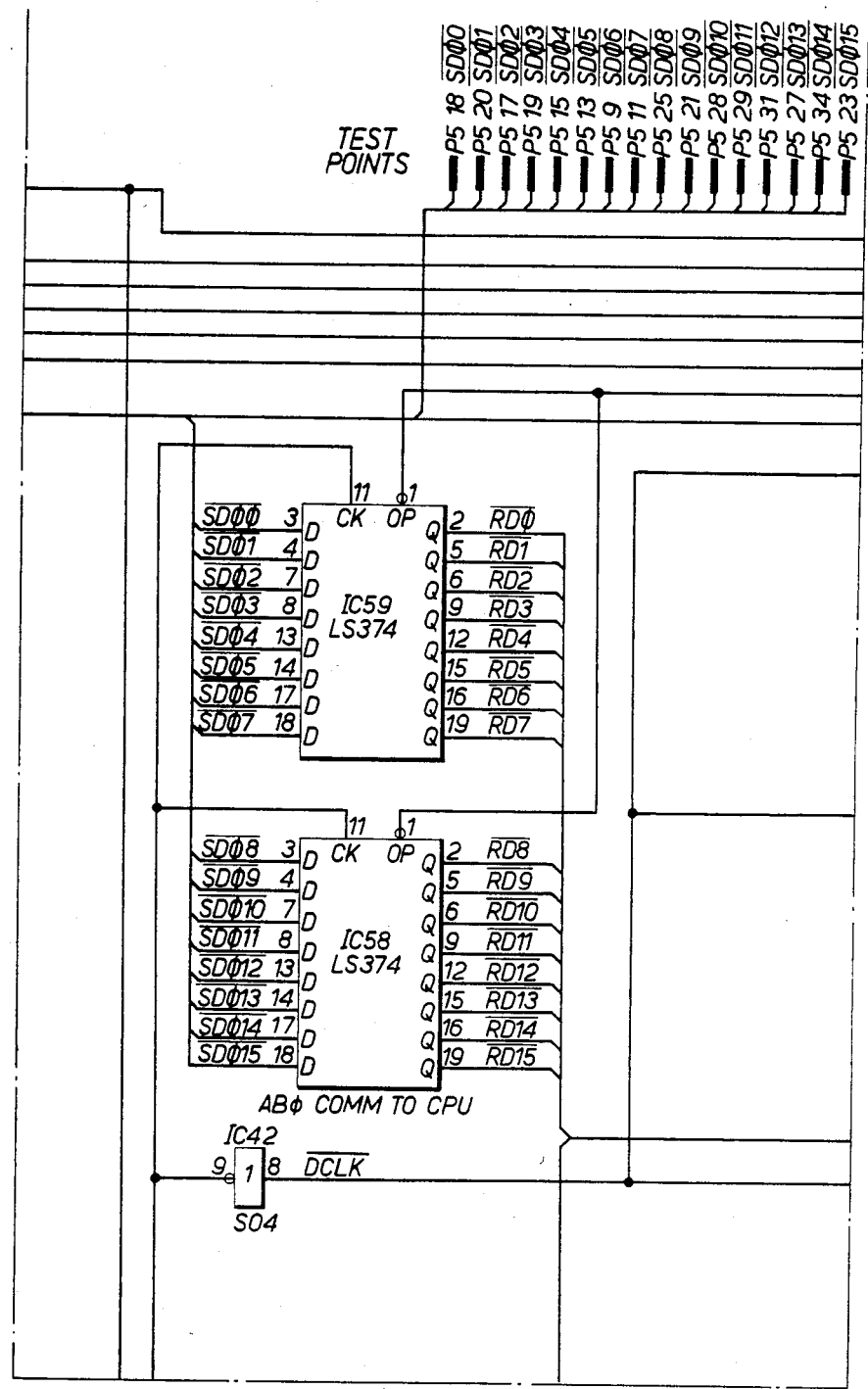

When the device select code, DS60, and the data output A, D0A, signals are received from the computer on lines 13, the command on DATA 0-15 bus 12 is written into the AB0 ram during the positive half of DCLK (see FIG. 4) at the address specified by the entry address logic. Similarly for DS60 and D0B signals received on lines 13, data is written into the AB1 ram. Commands as exemplified below may be sent to the TDM DSC20 by addressing shelf 0. The TDM DSC20 interrogates AB 8-15 and decodes the appropriate command as shown in table 1.

| AB | 8 | 9 | 10 | 11 | 12 | 13 | 14 | 15 | |
|---|---|---|---|---|---|---|---|---|---|
| | X | X | X | 0 | 1 | 1 | 1 | X | Read Opposite Bus |
| | X | X | X | 1 | 0 | 1 | 1 | X | Release Bus |
| | 0 | 1 | X | 1 | 1 | 0 | 1 | X | Transmit Lower Byte |
| | 1 | 0 | X | 1 | 1 | 0 | 1 | X | Transmit Upper Byte |
| | 0 | 0 | X | 1 | 1 | 0 | 1 | X | Transmit Both Bytes |
| | X | X | X | 1 | 1 | 1 | 0 | X | Receive Enable |

X = Don't Care

When a Read Opposite Bus ROB command is decoded on the AB0 bus, the AB1 command word is copied on the DB bus and read into the receive register to be read by the computer. Similarly on the AB1 bus an ROB command reads the AB0 word into the receive register. This facility is used to test the TDM DSC20 and the intershelf bus for data integrity.

Figures 4, 4A, 5:
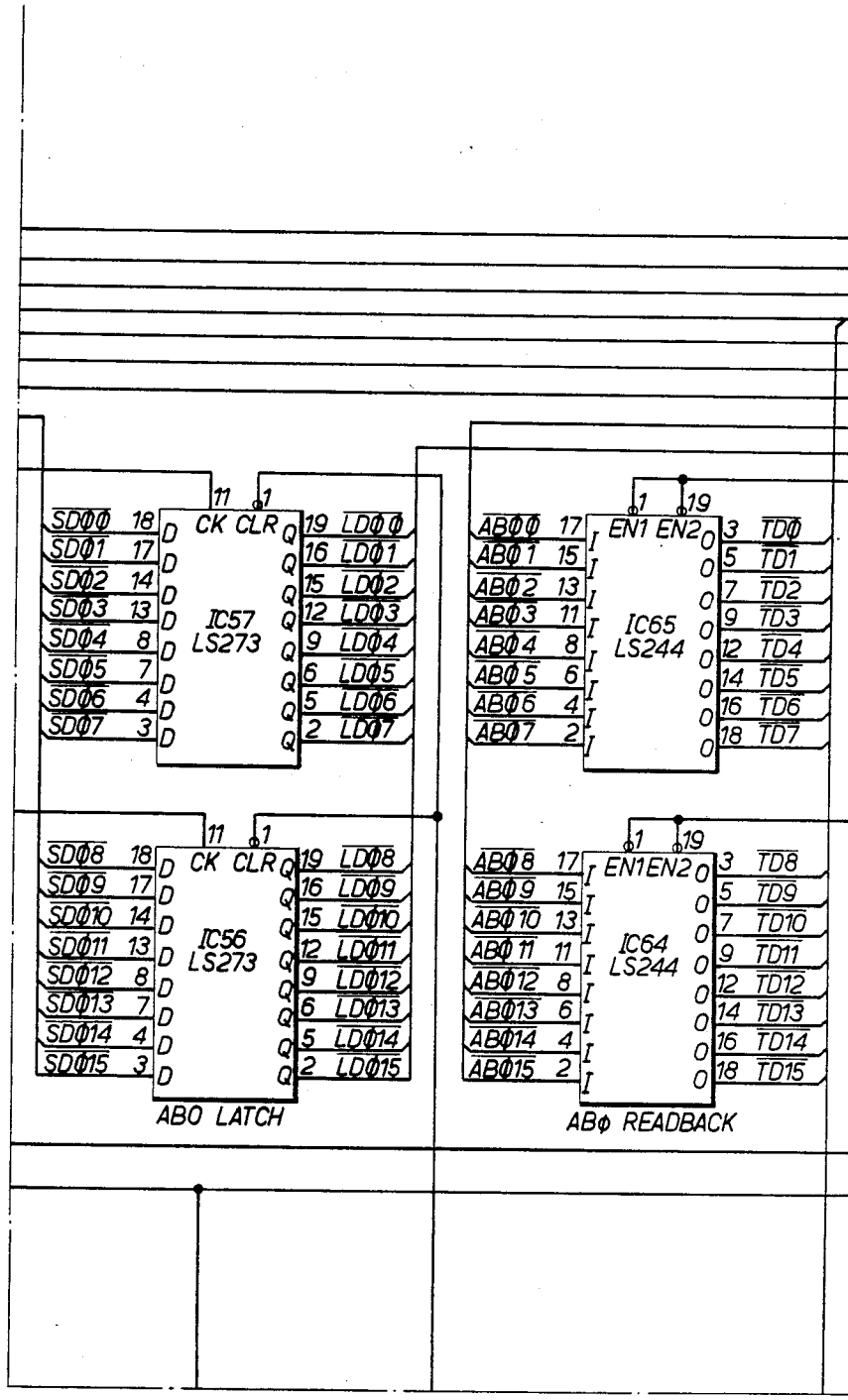
FIGS. 5 to 10 show timing diagrams explaining the operation of the controller.
Figures 4, 4A, 5, 6:
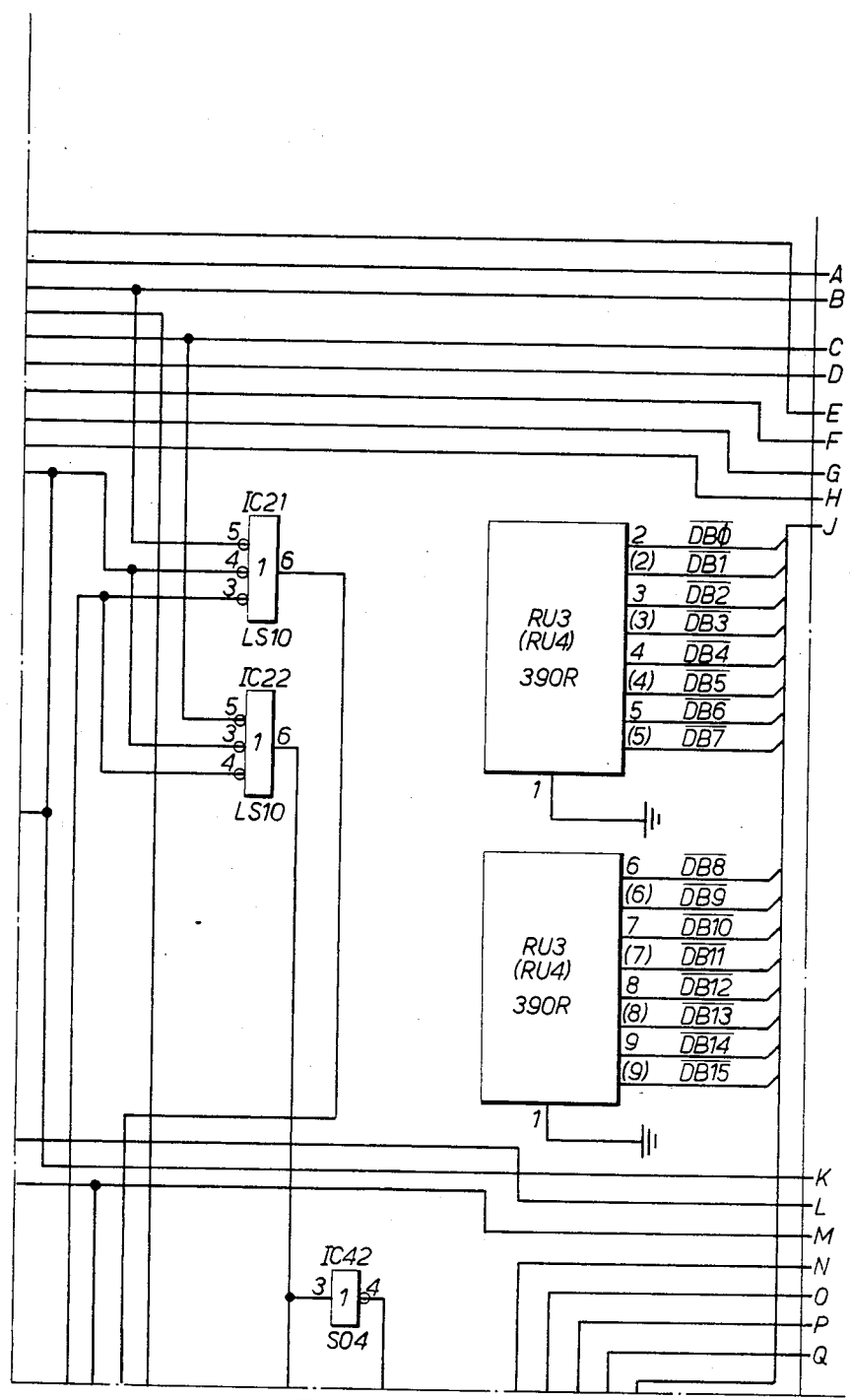

When a Release Bus command is decoded a RLS BUS signal is output on the intershelf bus which causes all telephony groups, to stop transmitting FIG. 6 shows relative timing of these signals.

When a Transmit Upper Byte command generated by the computer 10 is decoded, the data in the Upper Byte Register is enabled onto DB0-7 on the Intershelf Bus.

When a Transmit Lower Byte command is decoded the data held in the Lower Byte Transmit Register is enabled onto DB8-15 on the Intershelf Bus 112.

When a Transmit Both Bytes command is decoded DB0-7 and DB8-16 are enabled onto the Intershelf Bus 112.

See timing diagrams FIG. 5 for relative timings of these signals.

When a Receiving command is decoded by the DSC the data present on the Data bus of ISB is latched into the Receive Register.

Figures 4, 4A, 5, 6, 7:
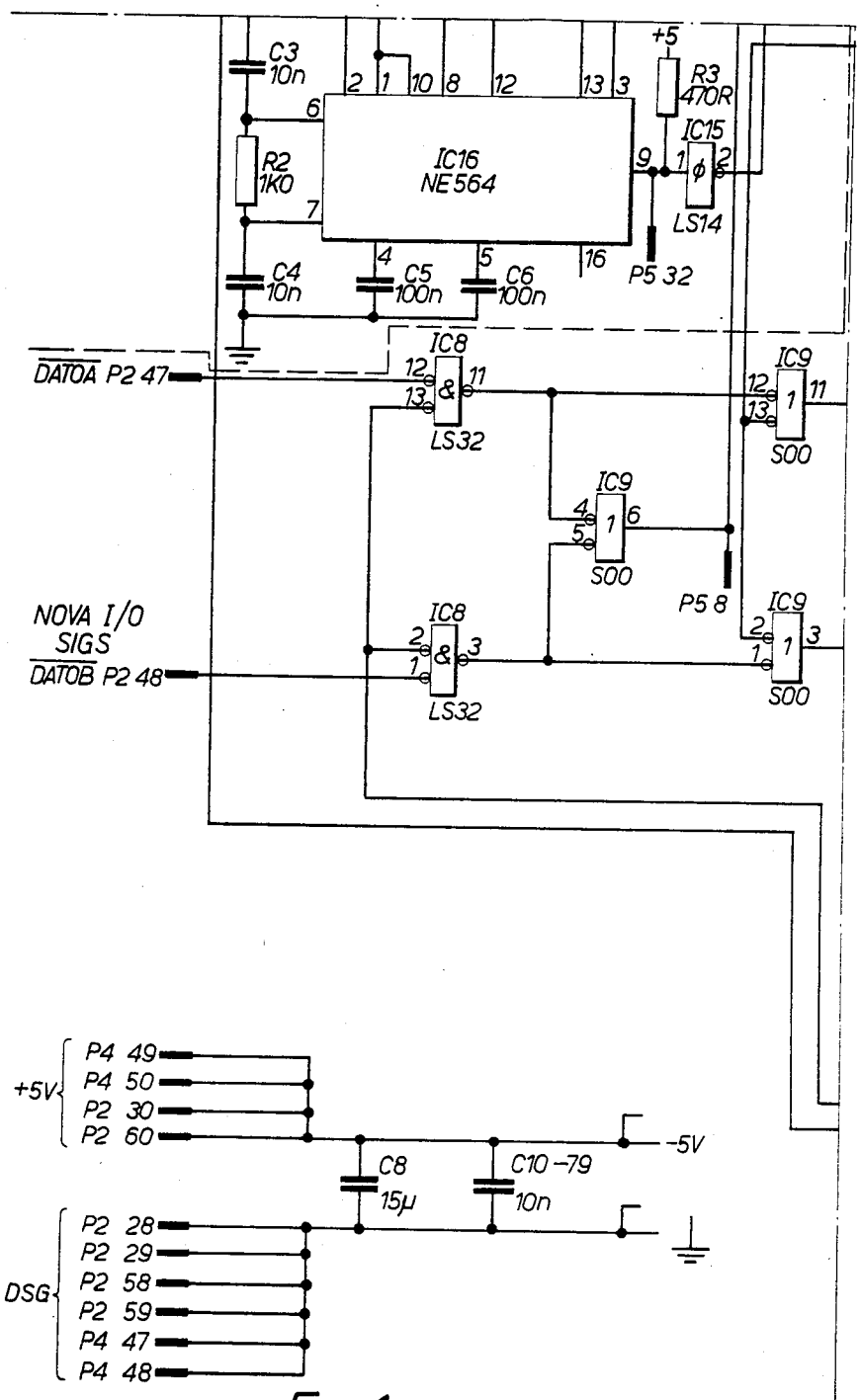

For relative timings of this command see FIG. 7.

Figure 3:
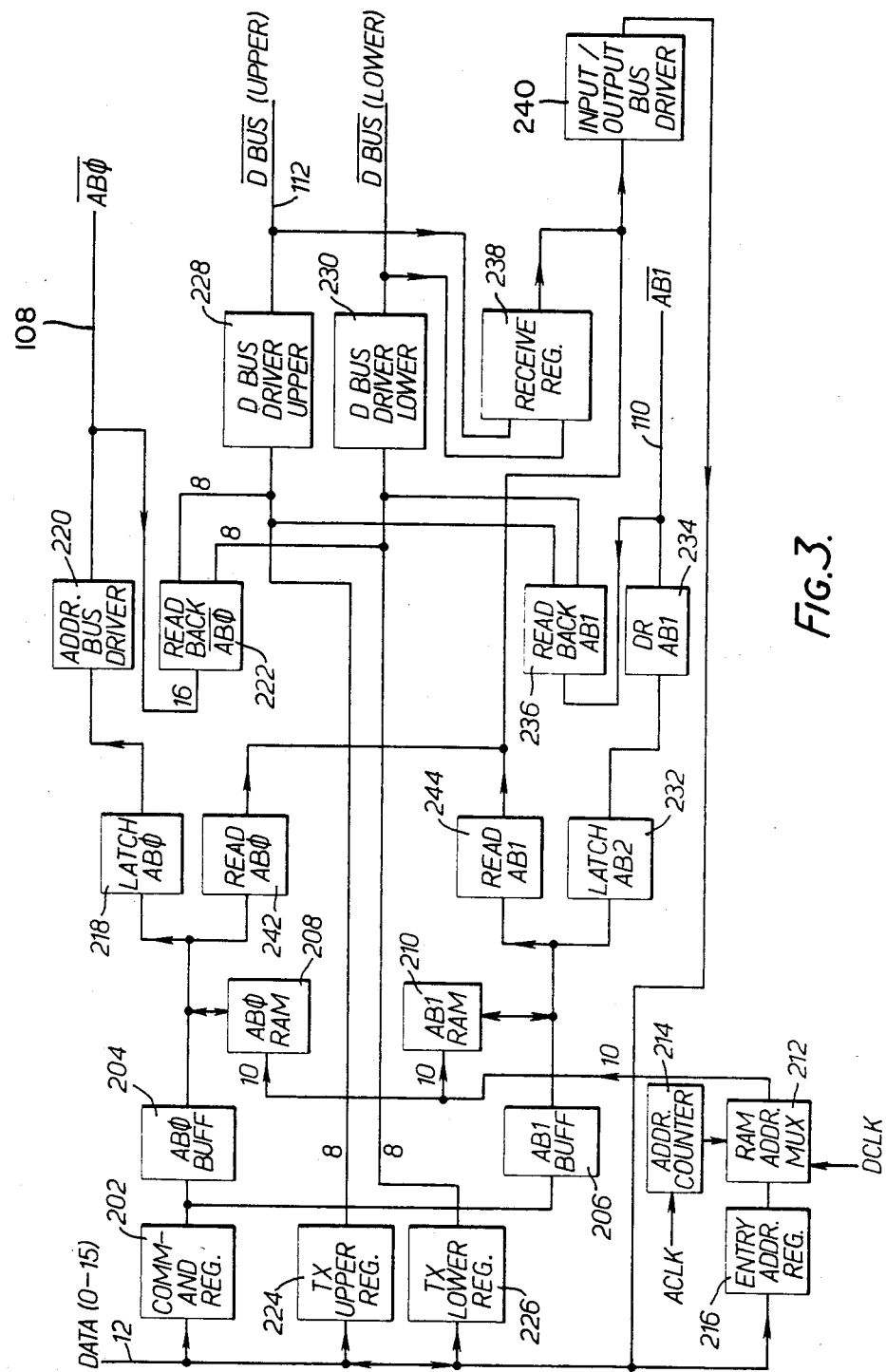
FIG. 3 shows a block circuit diagram of the DSC controller, FIGS. 4A (1-12) and 4B (1-10), when assembled together per

With reference to FIG. 3 the controller 20 is shown in block diagram form in greater detail. Signals (Data bits 0-15) are received from controller on bus 12. Except where otherwise indicated each line represents a 16 bit bus, other bus widths being indicated by numerals.

The controller 20 comprises a command register 202 the output of which is connected to two address buffers 204, 206 for AB0 and AB1. The outputs of these buffers 204, 206 are connected respectively to AB0 and AB1 random access memories 208, 210; the entry of information into these memories being controlled by a random access memory address multiplex circuit 212 clocked by an address counter 214 driven by the A clock, the multiplexer 212 being controlled by an entry address register 216 which receives address instructions from bus 12.

Addresses output from memory 208 are latched by a latch 218 and subsequently clocked to an address bus driver 220. A read back address circuit 222 is connected to bus 108. The outputs of circuit 222 are connected to transmit upper register and transmit lower register circuits 224, 226. The transmit upper and lower registers 224, 226 are also connected to data bus drivers upper and lower 228, 230 to enable data from bus 12 to be transmitted onto the upper and lower bytes of bus 112.

Similarly RAM 210 is connected to a latch 232 and to an AB1 driver 234 to output address information onto address bus 110. Bus 110 is connected to a read back address circuit 236 which is connected to the bus drivers 228, 230.

The address buses 112 (Data bus upper and lower) are connected to a receive register 238 which outputs data to an input/output bus driver 240 the output of which is connected to bus 12.

In operation the entry address register 216 dictates the address at which data is written into both RAM's 208 and 210. The multiplexer 212 provides a 10 bit address for both RAMS 208, 210. Also information stored in the RAM's 208, 210 can be read out and fed via input-/output bus driver 240 back to the computer via bus 12 for checking.

Also address information output on address buses 108 and 110 can be read back via circuits 222 and 236 respectively and fed via drivers 228, 230 and receive register 238 to driver 240 and hence back to the computer for checking.

The connection table is a Time Division Multiplexed addressing system consisting of 512 slots each 32 bits wide. Each slot is divided into two 16 bit blocks, one of which is loaded into the AB0 bus and the other onto the AB1 bus. Shown below is the bit allocation for the 16 bit command word which is loaded onto the address buses.

| MSB. | 0 1 2 3 4 | 5 6 7 8 9 | 10 11 12 13 14 15 | LSB |
|---|---|---|---|---|
| | SHELF ADDRESS | SLOT ADDRESS | CARD COMMAND | |

The connection table logic is RAM based (see FIG. 4B) with two ways of accessing the RAM. The addresses used to access the RAM are output from a 2-1 multiplexer 212 which selects 1 of 2 available addresses. The first address which is used to access the RAM during a read cycle is generated by a 1-512 cyclic counter (time slot counter) clocked by the positive going edge of D clock, which clock is actually a combination of D and A clock as described hereinafter (see FIG. 9).

The second address available is the address which is latched into the Entry Address latch on receipt of a Data out C DAT0C and DS60 signals from the computer as mentioned hereinafter.

These addresses are selected by DCLK where the output of the cyclic counter is enabled during the negative cycle of the clock and the Entry Address output on the positive cycle of the clock. Both addresses are used to access the RAM but during a read cycle it is only the data accessed by the cyclic counter address which is enabled onto the AB0 and AB1 buses.

When a DAT0A or DAT0B and DS60 signals are received, as mentioned hereinbefore, the command output on DAT0A-15 by the computer is written into the connection table rams.

Figures 4, 4A, 5, 6, 7, 8:
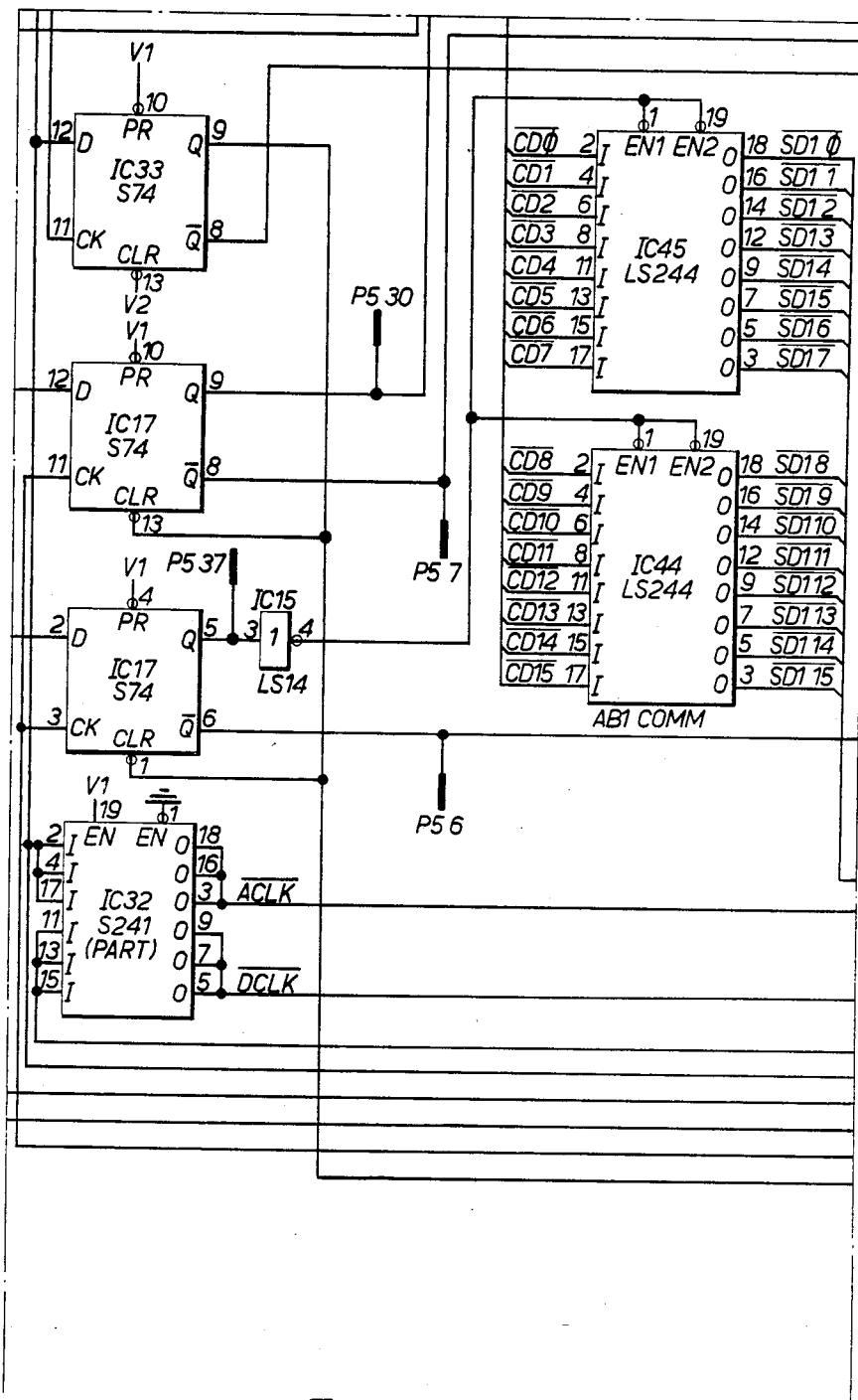
Figures 4, 4A, 5, 6, 7, 8, 9:
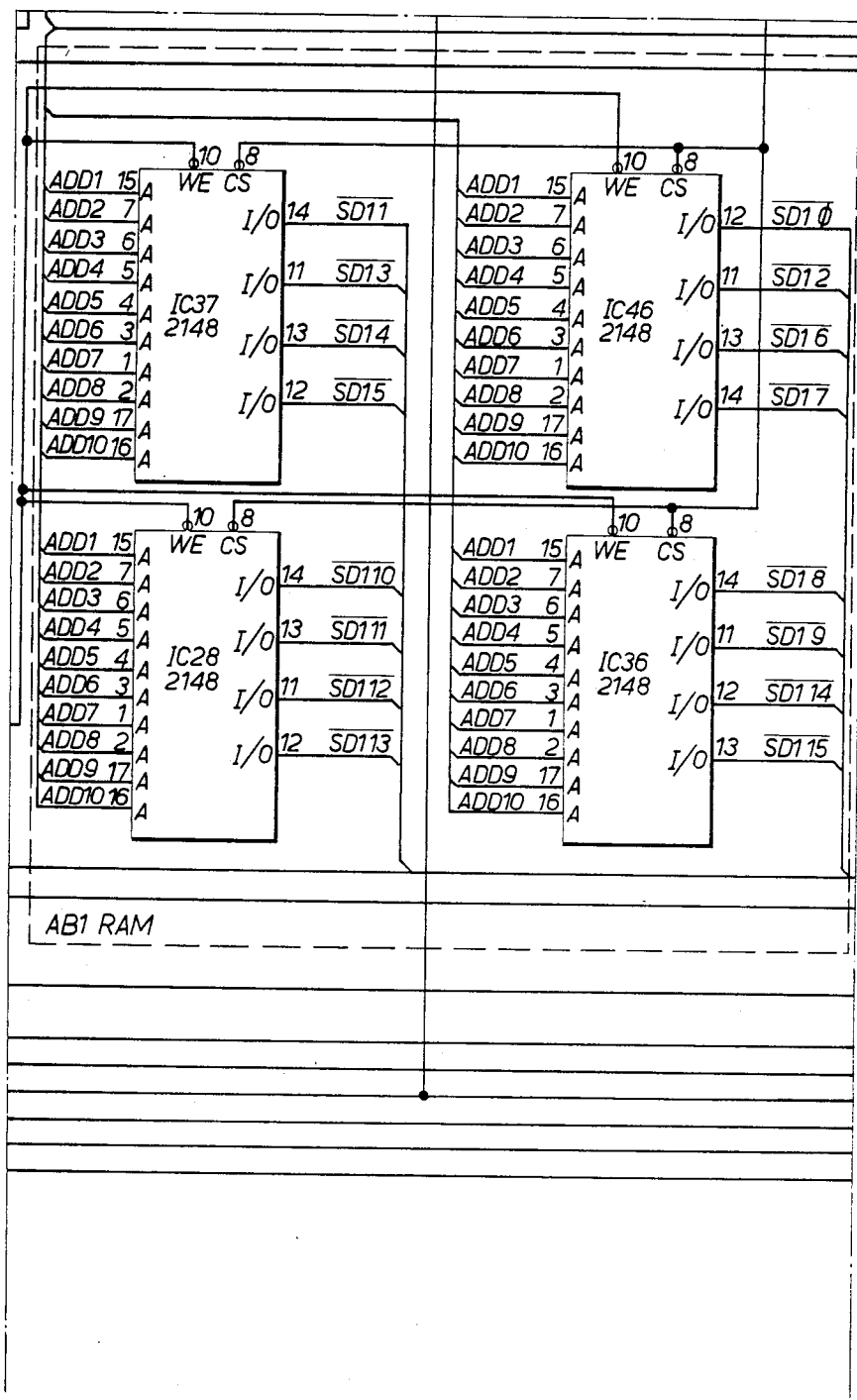
Figures 4, 4A, 5, 6, 7, 8, 9, 10:
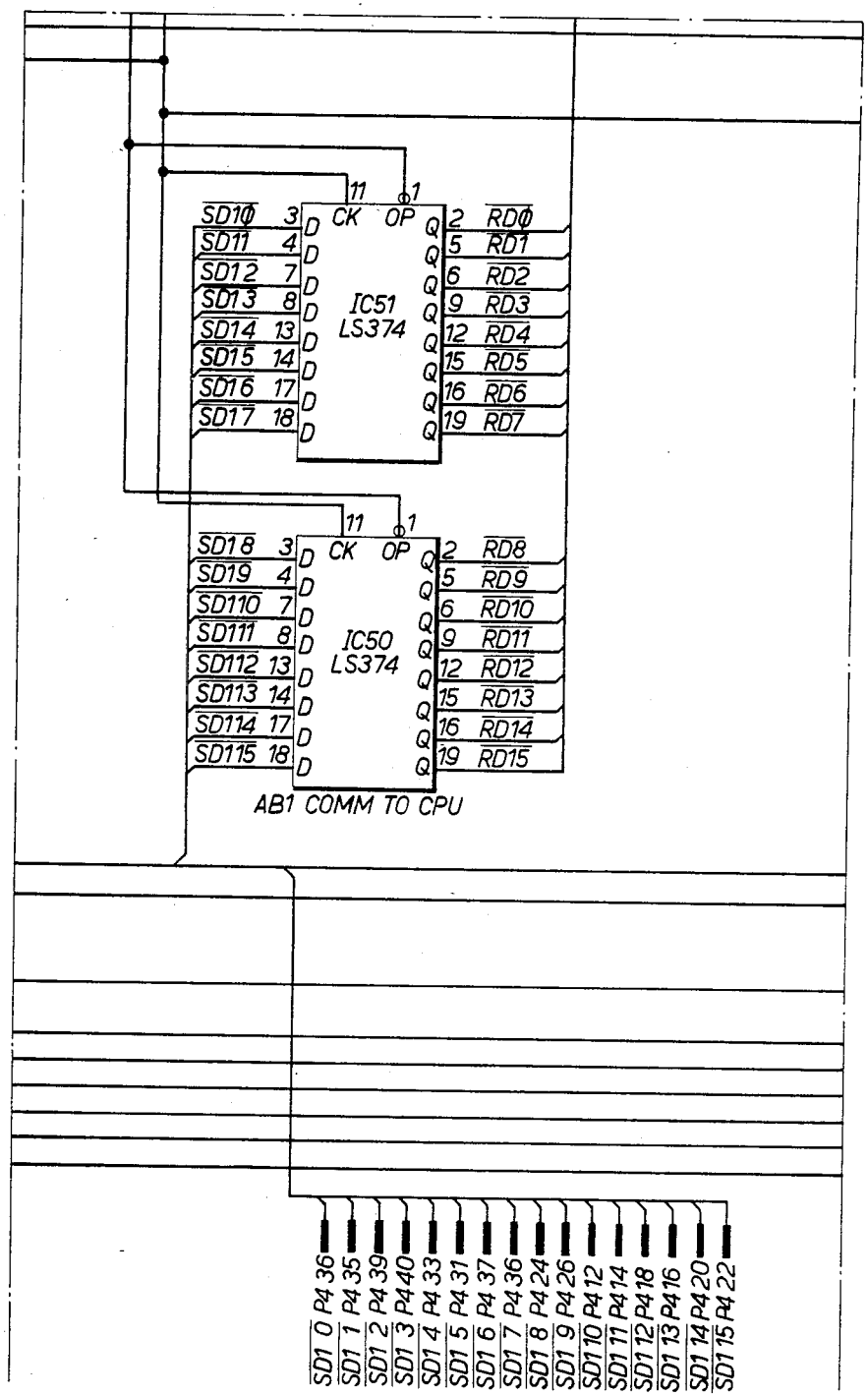

The address output by the Entry Address Registers 216, and enabled by the 2-1 multiplexer 212, is used to access the RAM and the data in the command registers in the computer 10 is written into the RAM by a WE signal derived from DCLK, as shown in FIG. 8.

When a system normalise signal is received, the 2-1 multiplexer 212 permanently selects the output from the cyclic counter and a "no operation" (NOP) is written into all locations in the connection table RAM. This operation clears the connection table of all commands.

Time slots 512 and 1 to 7 are called the Immediate Field and are treated differently to the other time slots 8-511. Time slots 8-511 are the non-immediate field and are used continuously for card reading whereas time slots 512 and 1 to 7 are used for the control of hardware—e.g. operating relays. When the count of 512 from the counter is decoded, the AB0 and AB1 drivers 220 which buffer commands onto the ISB are diabled; when the count of 8 is decoded, the drivers are enabled. Therefore under normal operating conditions the commands in the Immediate Field are not output onto the ISB. If the input output pulse I0PLS, signal is received from the computer, the AB0 and AB1 buffer disabling logic is disabled and during the next full immediate field the commands in slots 512 and 1 to 7 are output on the ISB 112.

The immediate field is used to generate special commands to receive and transmit status or to Up and Down cards.

Output onto the ISB is a signal called TS0 which is the 512 count decode signal from the counter clocked by DCLK to give a pulse once every frame.

When a DATOC and DS60 signal is received from the computer, the data present on DATA 6-15 from the computer is loaded into the Entry Address Register 216 (FIG. 3). The information received is an address in the range 1 to 512 and is the connection table slot number selected by the computer for the next command word output from the computer. The contents of the register is used to address the AB0 or AB1 rams on receipt of a DOA60 or DOB60 as described previously.

When a Data in A (DIA) and DS60 signal is received from the computer, the command word in the specified time slot, AB0, is output onto the common control DATA 0-15 bus. Similarly when a Data in B (DIB) and DS60 is received the word in AB1 is output onto DATA 0-15.

The functionality of the DSC is indicated by the state of an UP/DOWN latch. If a CLR and DS61 signal is received from the computer, the UP/DOWN latch is set to DOWN. This occurs when the computer decides to disable the DSC due possibly to a malfunction. An LED is illuminated indicating the DSC is DOWN. If a STRT and DS61 signal is received the UP/DOWN latch is set to UP and the LED is extinguished. The UP/DOWN latch is set to UP when the equipment is brought into use by the reset signal IORST. With reference to FIG. 2 if the A side DSC is "DOWN" the B side DSC takes over control of the exchange.

When IORST or the CLR, DS61 are received the 1-512 counters are cleared to 1, and SYN is sent up the ISB to UP the other cards in the system. A SYN signal fills the connection table with NOPs.

The data from the Common Control Computer, DATA 0-15, is latched into the Transmit Registers on receipt of DATOC and DS61 signals from the computer.

The data latched in the Receive Register is output to the computer as DATA 0-15 on receipt of DATIA and DS61 signals from the computer.

From a basic crystal controlled clock of 16.384 MHz generated on the TDM, two clock signals ACLK and DCLK are generated and used to control the timing of commands and data manipulation along the ISB and along the highway bus 12. Both clocks are 4.0 96 MHz 50.50 mark space ratio signals with ACLK leading DCLK by 90°. An option exists to sync the clocks to a 2.048 MHz clock from a Trunk Controller or other suitable external clock source.

The DSC 20 monitors the six device select bits DS0-5. When the computer 10 sends codes 60 and 61, the signals DS60 and DS61 are generated and the following DSC functions are enabled.

| DS60 | DS61 |
|---|---|
| Busy Logic | UP/DOWN latch |
| Entry Address Register load | Transmit Register load |
| Time Slot disable | Receive Register load |
| Connection table logic | |

The busy flag, SELB is set when an IOPLS signal is received to indicate that an immediate field operation is pending, the flag is cleared at the end of the immediate field. SELB is also set for the duration of a System Normalise, SYN.

Positive logic is used in this document

| SIGNAL | TRUE = Low Volts |
| | FALSE = High Volts |
| SIGNAL | TRUE = High Volts |
| | FALSE = Low Volts |

The power supply voltage for the system is +5±0.25 Volts. This supply is decoupled by a 15 μF bulk decoupling capacitor and a 10 nF capacitor at every dilic (dual-in-line integrated circuit) position.

Figures 4, 4A, 5, 6, 7, 8, 9, 10, 11:
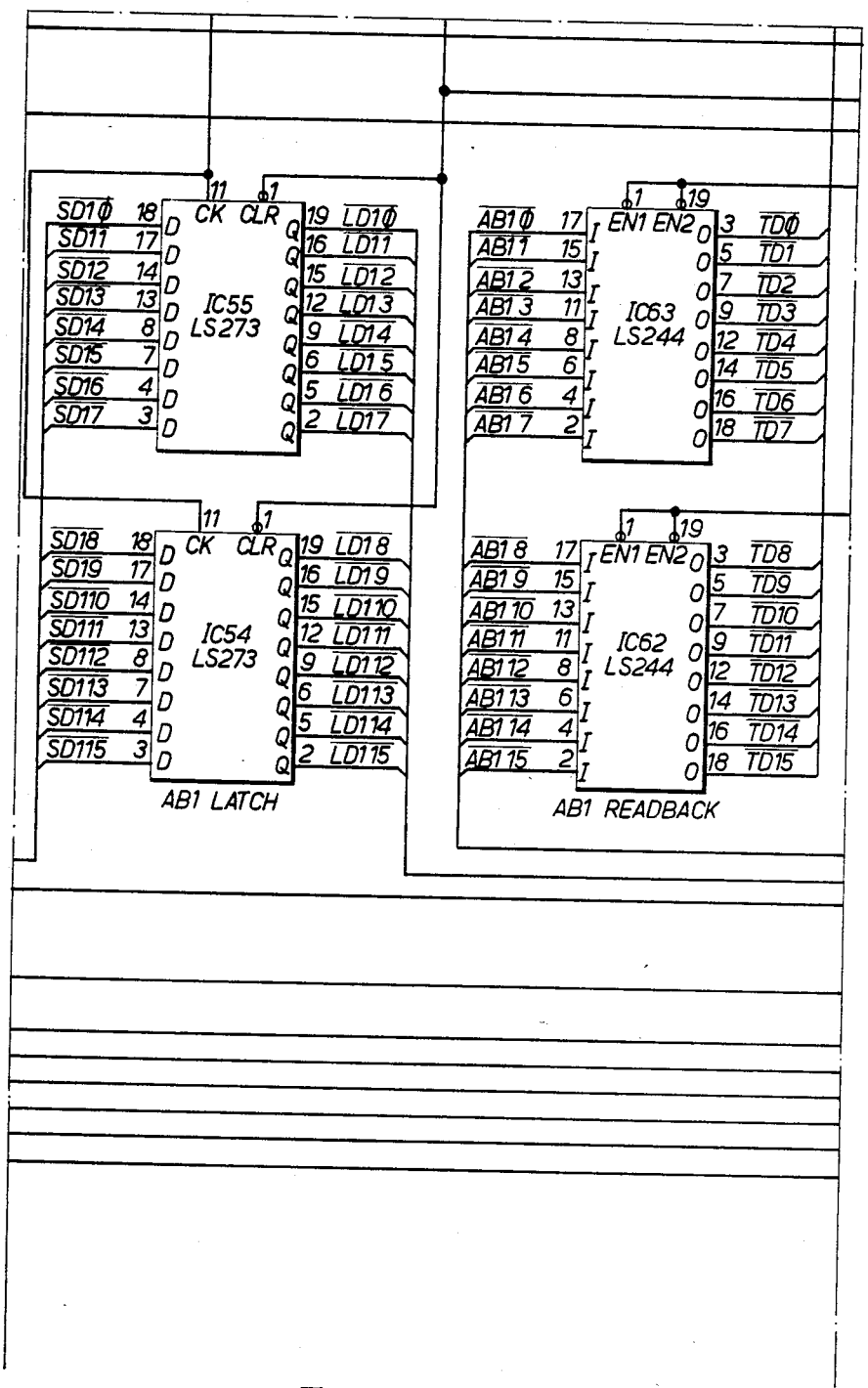
FIG. 11 shows in block diagram form the control section of the shelf interface of FIG. 2.

With reference now to FIG. 11, the shelf interface circuit 104 is shown in greater detail. The circuit receives addresses on the two address buses 108, 110. Five bits of each address are decoded in decode circuits 302, 304 to produce respective shelf enable circuits on lines 306, 308. The remaining 11 bits are buffered in buffers 310, 312 and used as shelf bus addresses on shelf address buses B AB0 and B AB1.

Data is received and transmitted on bus 112 as two sets of eight bits designated upper and lower bytes on buses 314, 316. These are received and transmitted by bi-directional buffers 318,320, onto from and to shelf buses B DATA BUS UPPER 322 and B DATA BUS LOWER 324. Control of the passage of data from buffers 318,320 is by a DOUT UPPER and DOUT LOWER signal.

Referring now to FIG. 2, the interface circuit 1 of the present invention is shown interposed between the telephony groups 100 via the shelf bus S1 and the intershelf bus 108, 110, 112.

Figures 4, 4A, 5, 6, 7, 8, 9, 10, 11, 12:
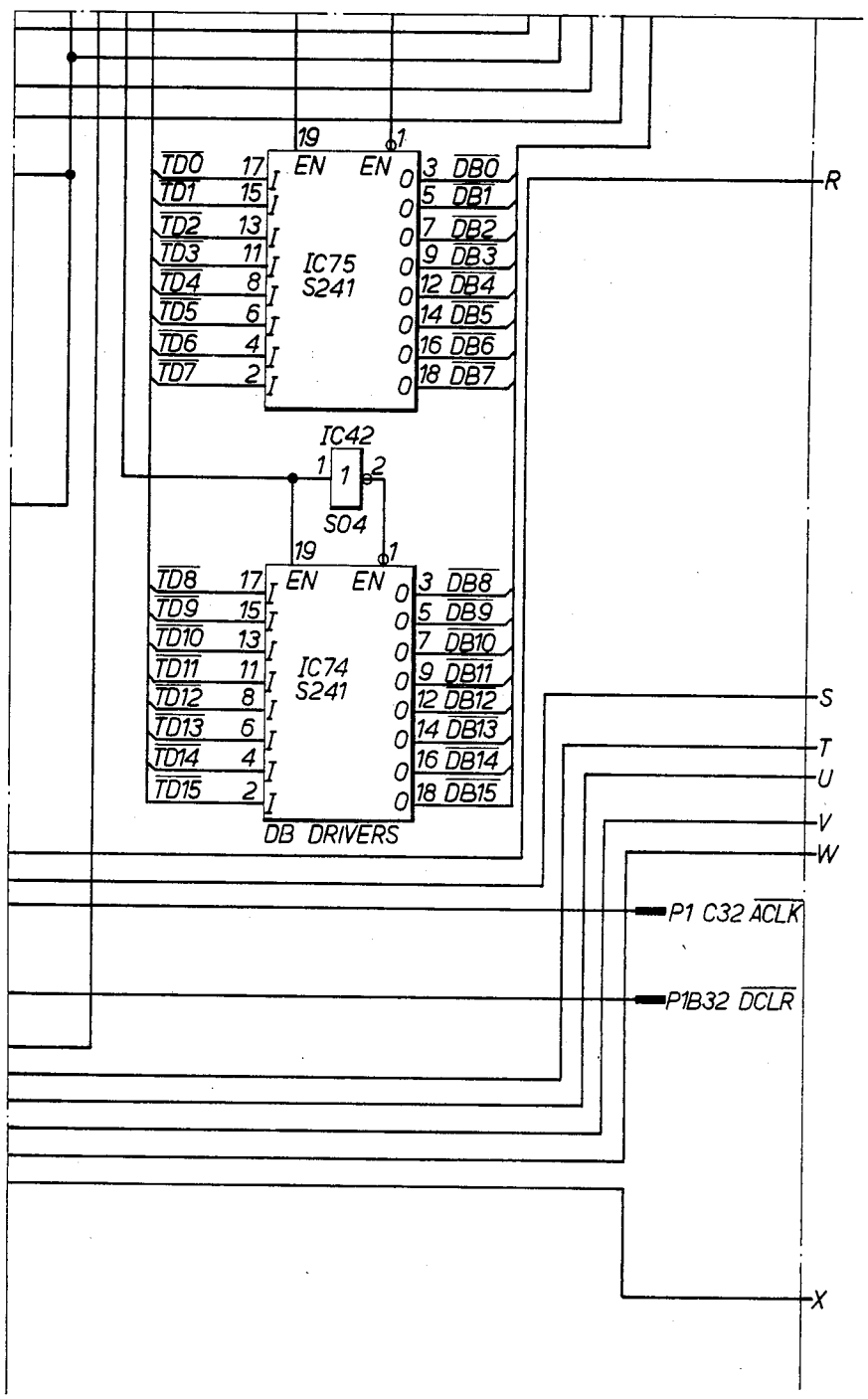
FIG. 12 shows an interface circuit for use in the present invention in block diagram form, FIGS. 13A to O, when assembled per
Figures 1, 4B:
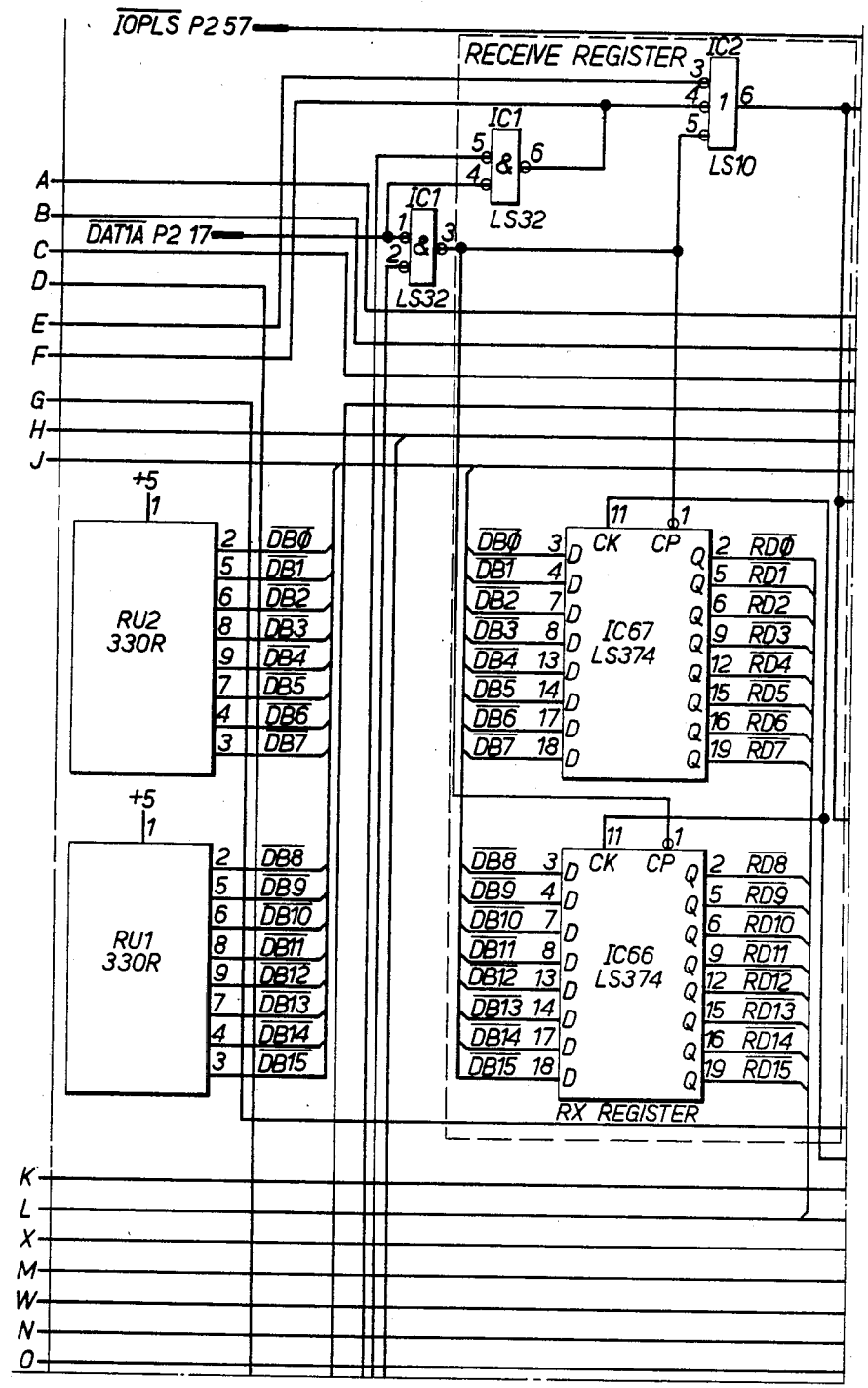
Figures 2, 4B:
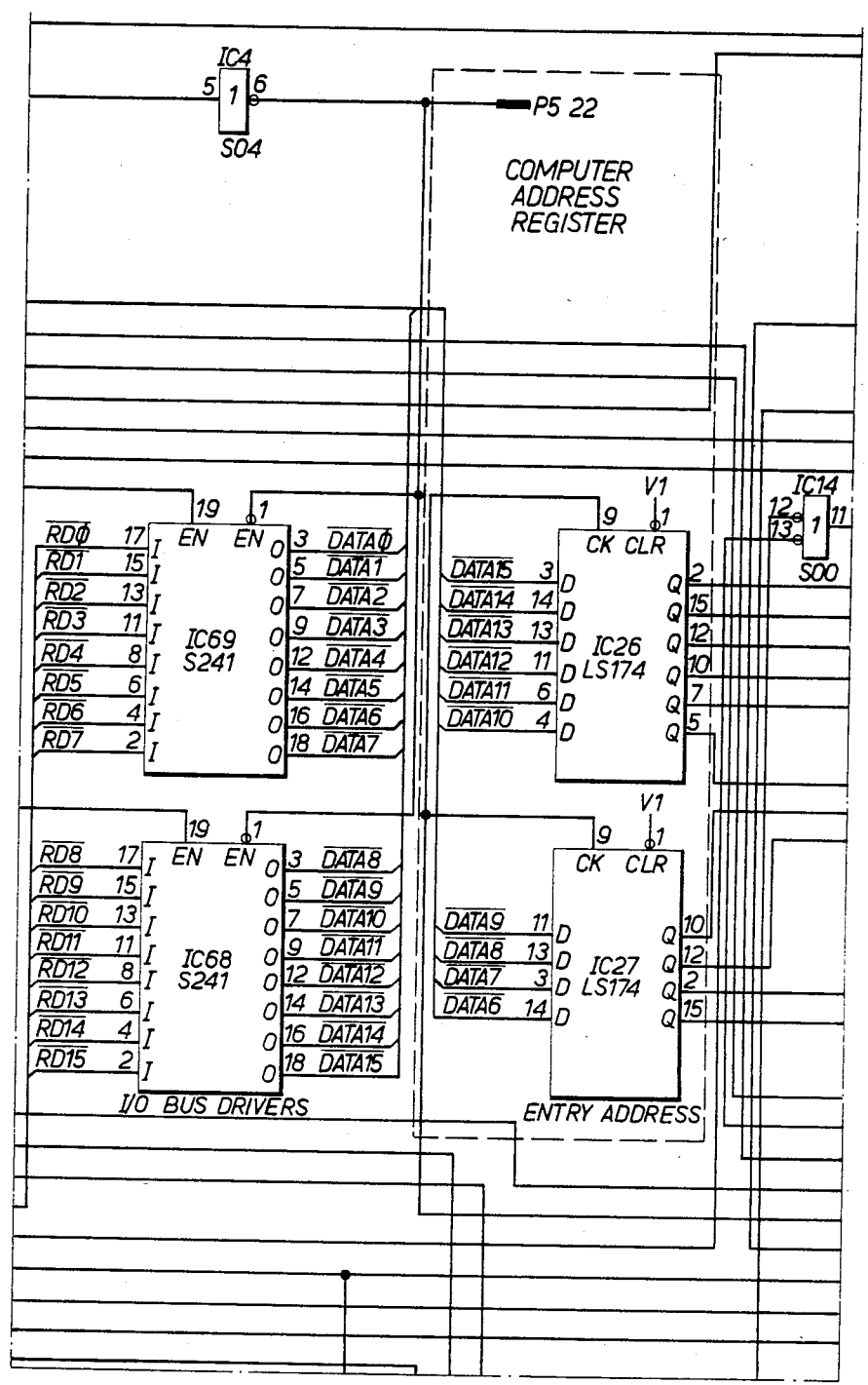
Figures 3, 4B:
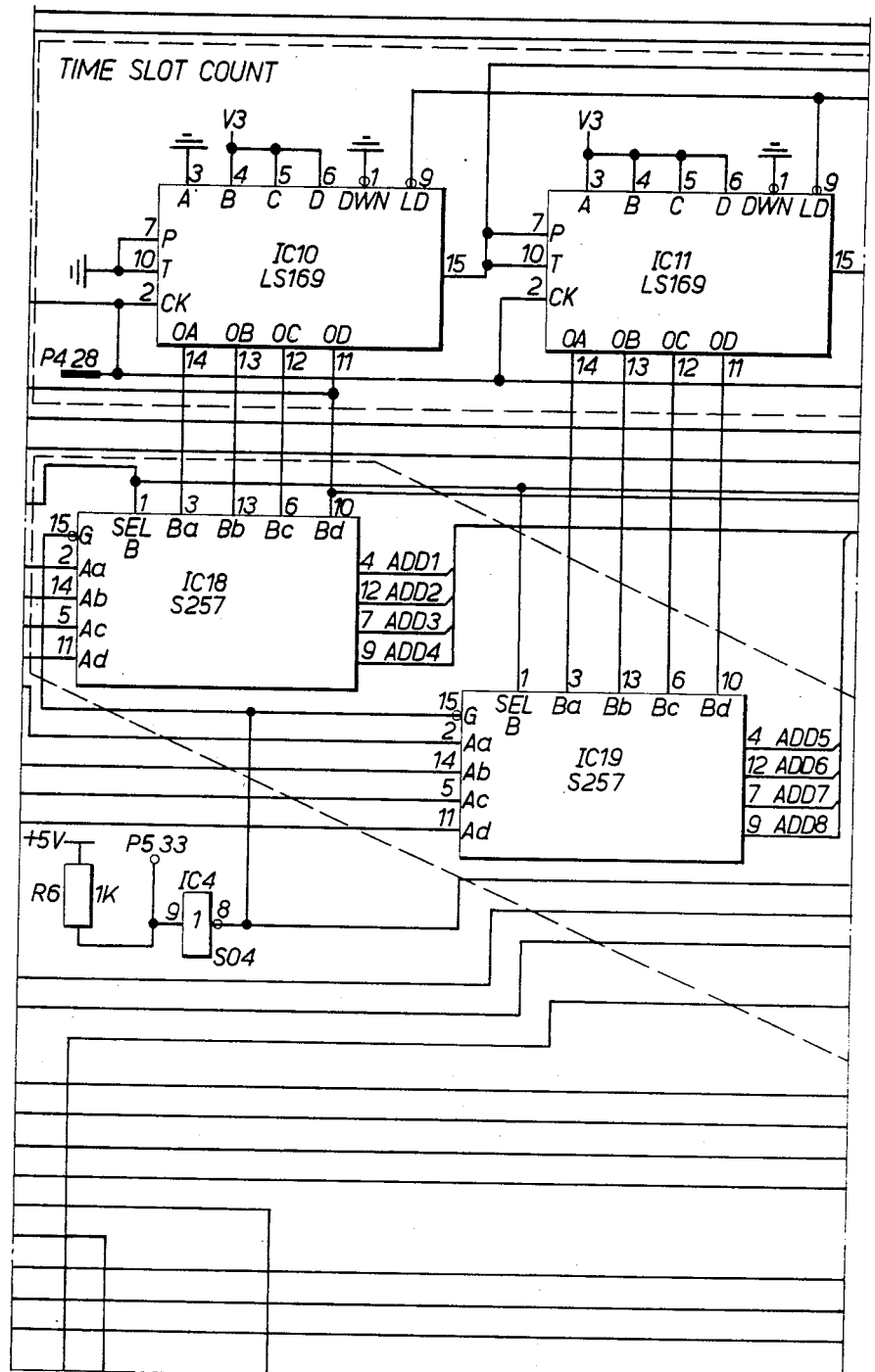
Figures 4, 4B:
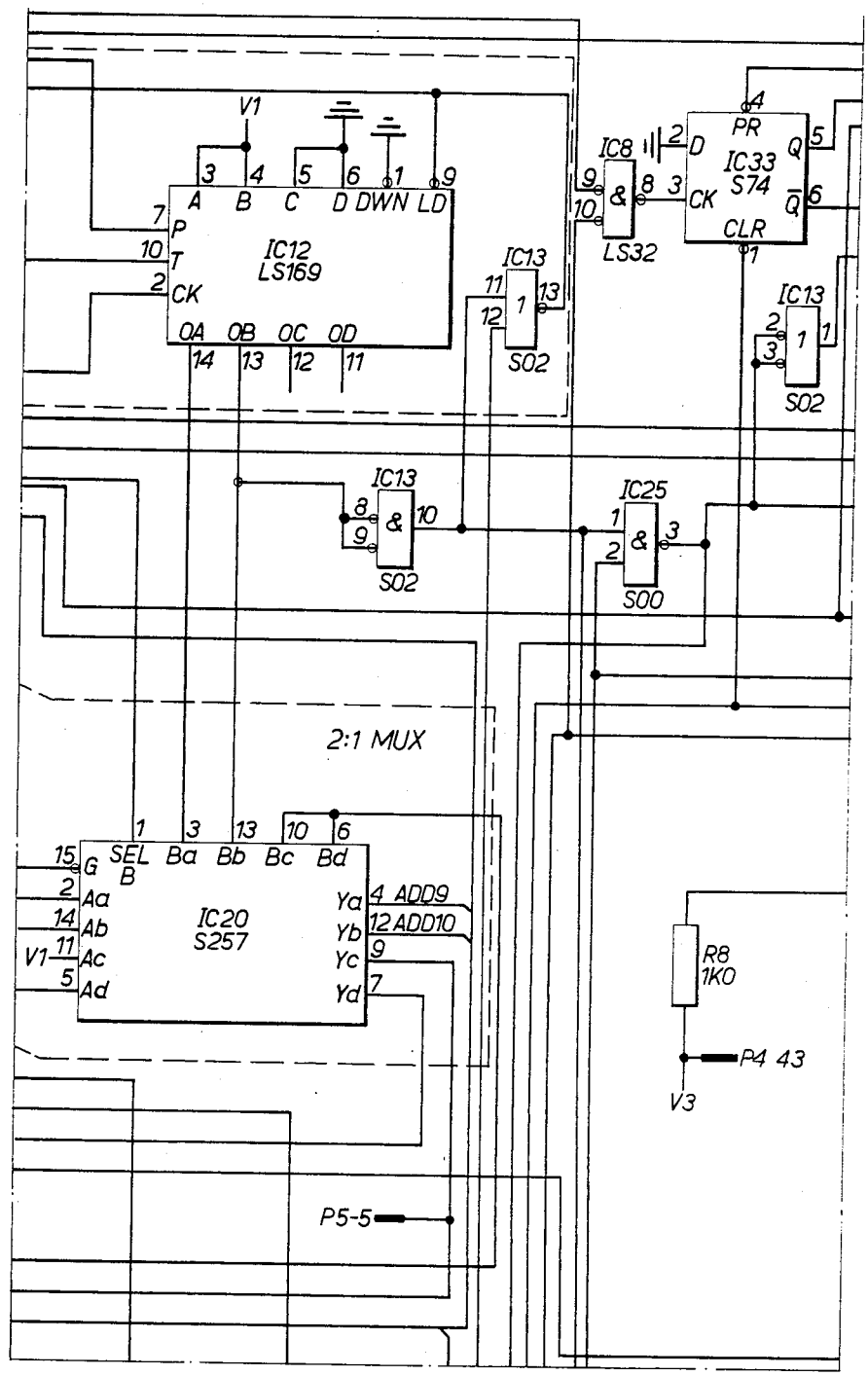
Figures 4, 4B, 5:
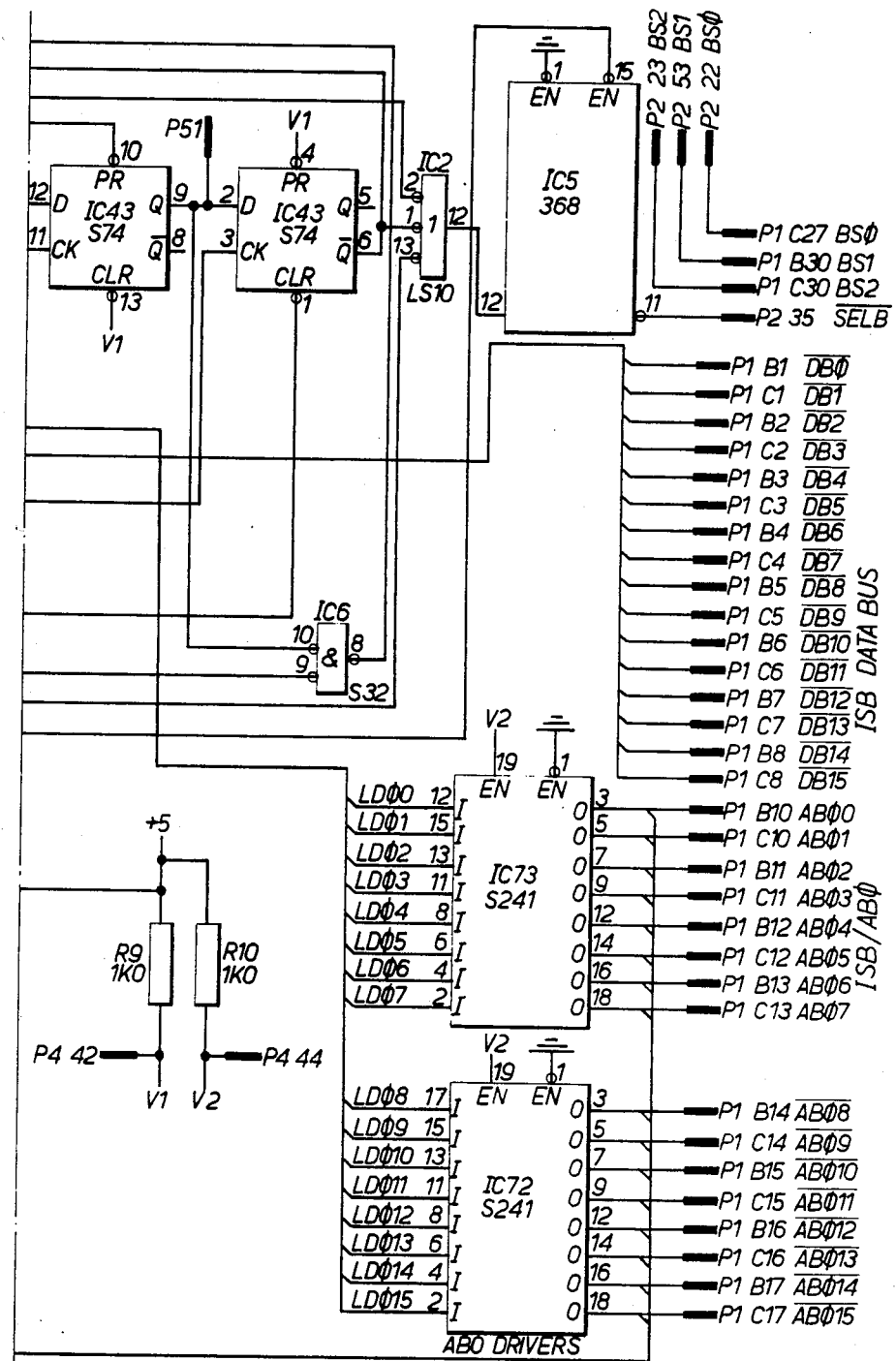
Figures 4, 4B, 5, 6, 7:
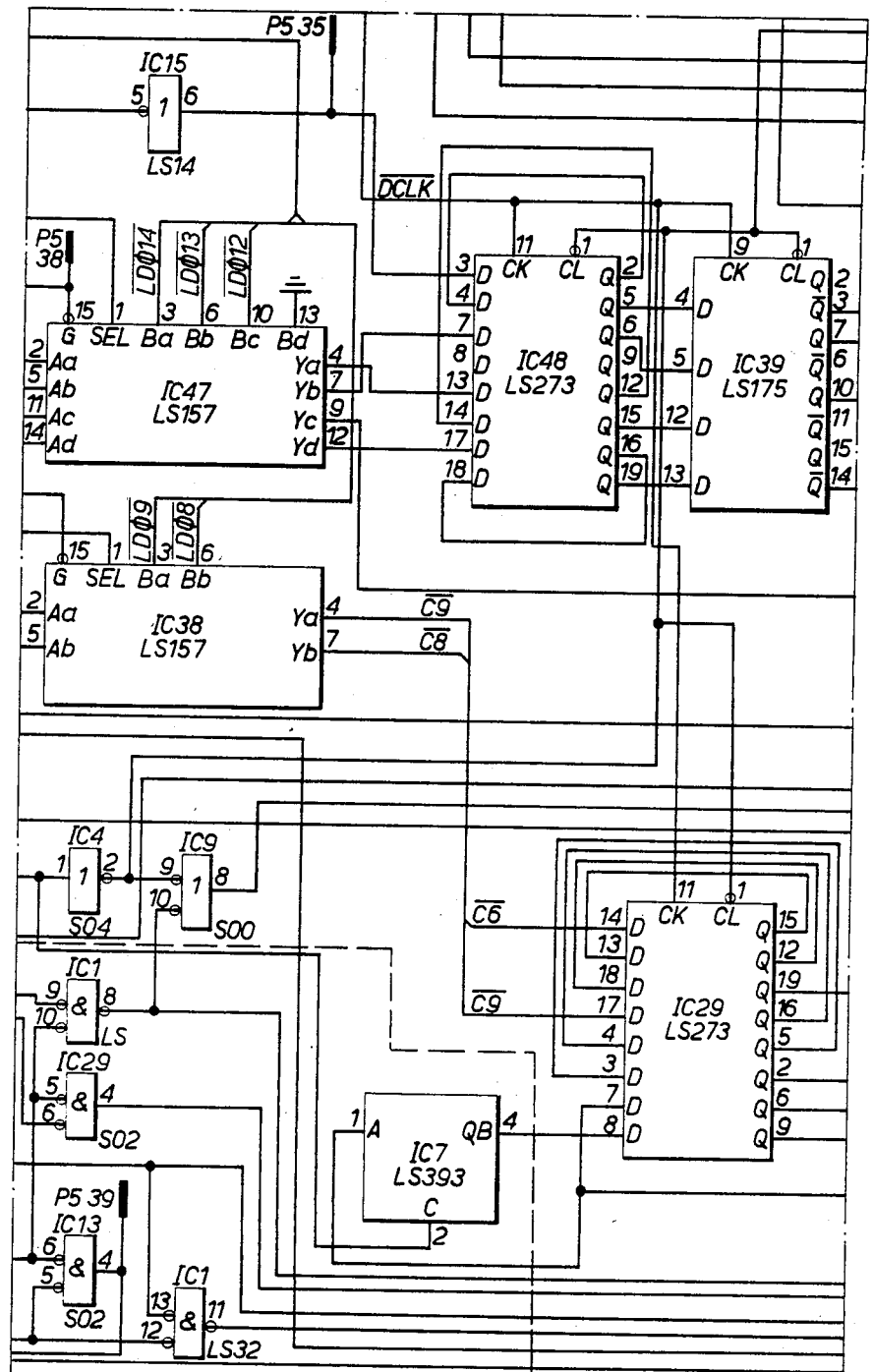
Figures 4, 4B, 5, 6, 7, 8:
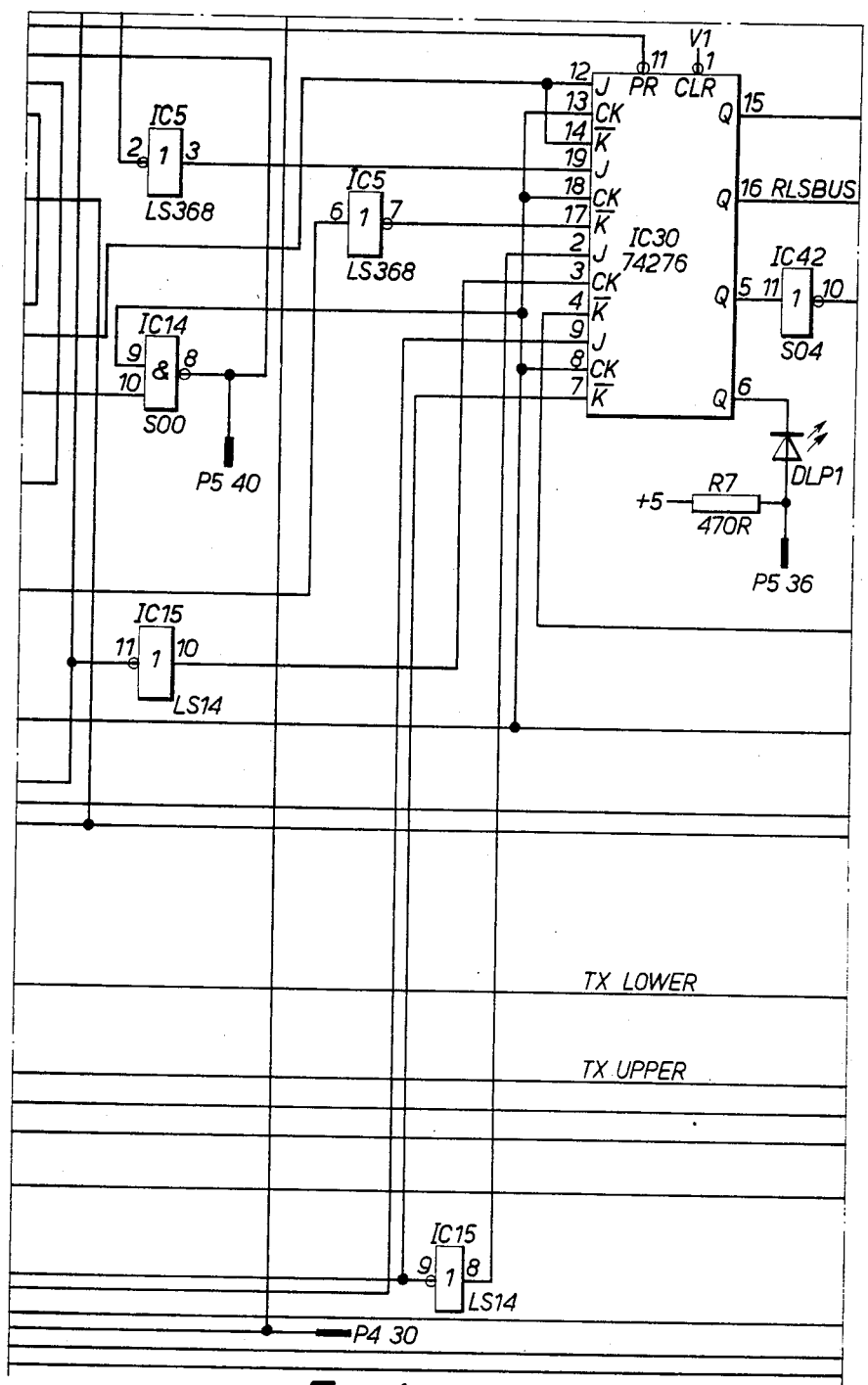
Figures 4, 4B, 5, 6, 7, 8, 9:
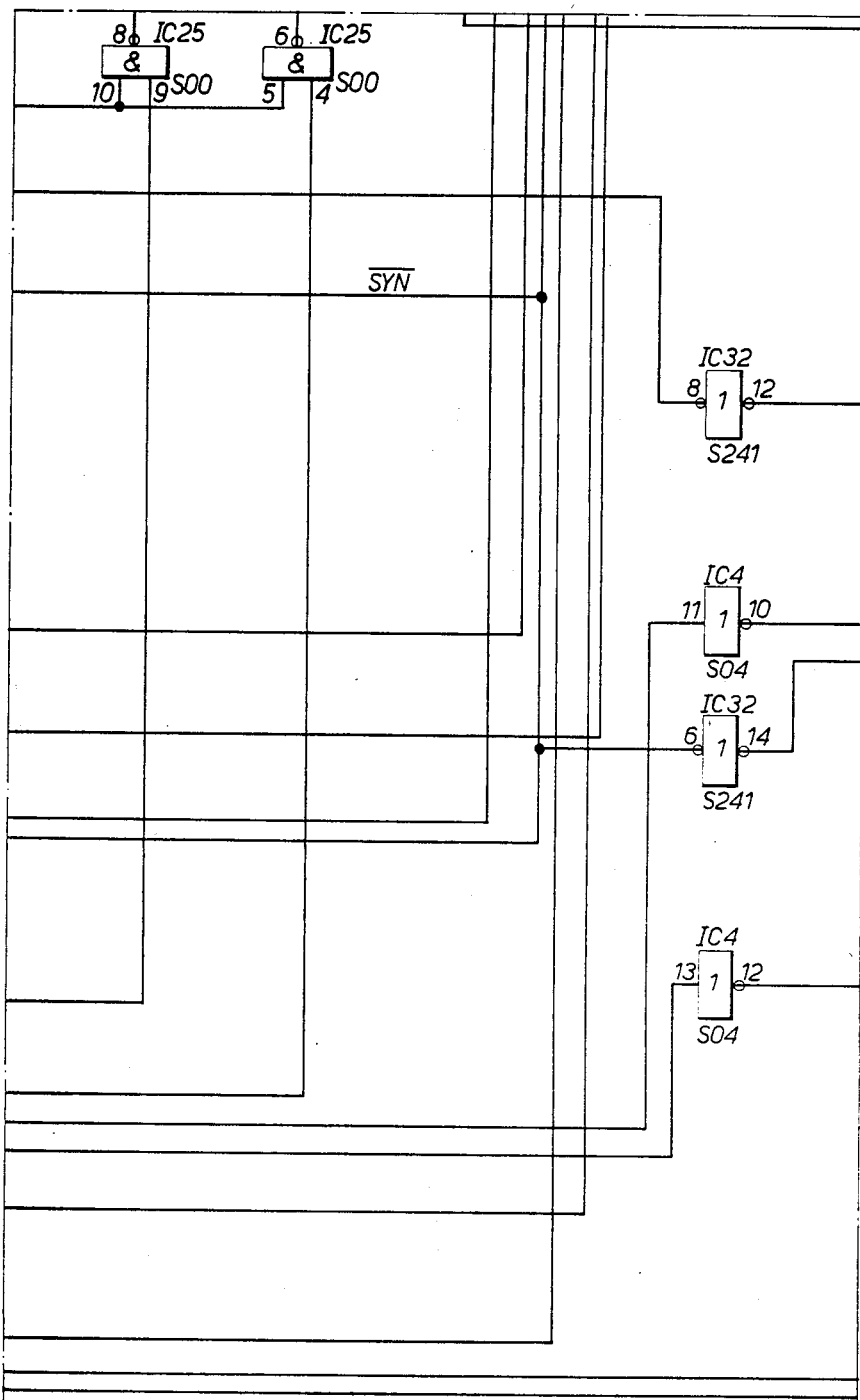
Figures 4, 4B, 5, 6, 7, 8, 9, 10:
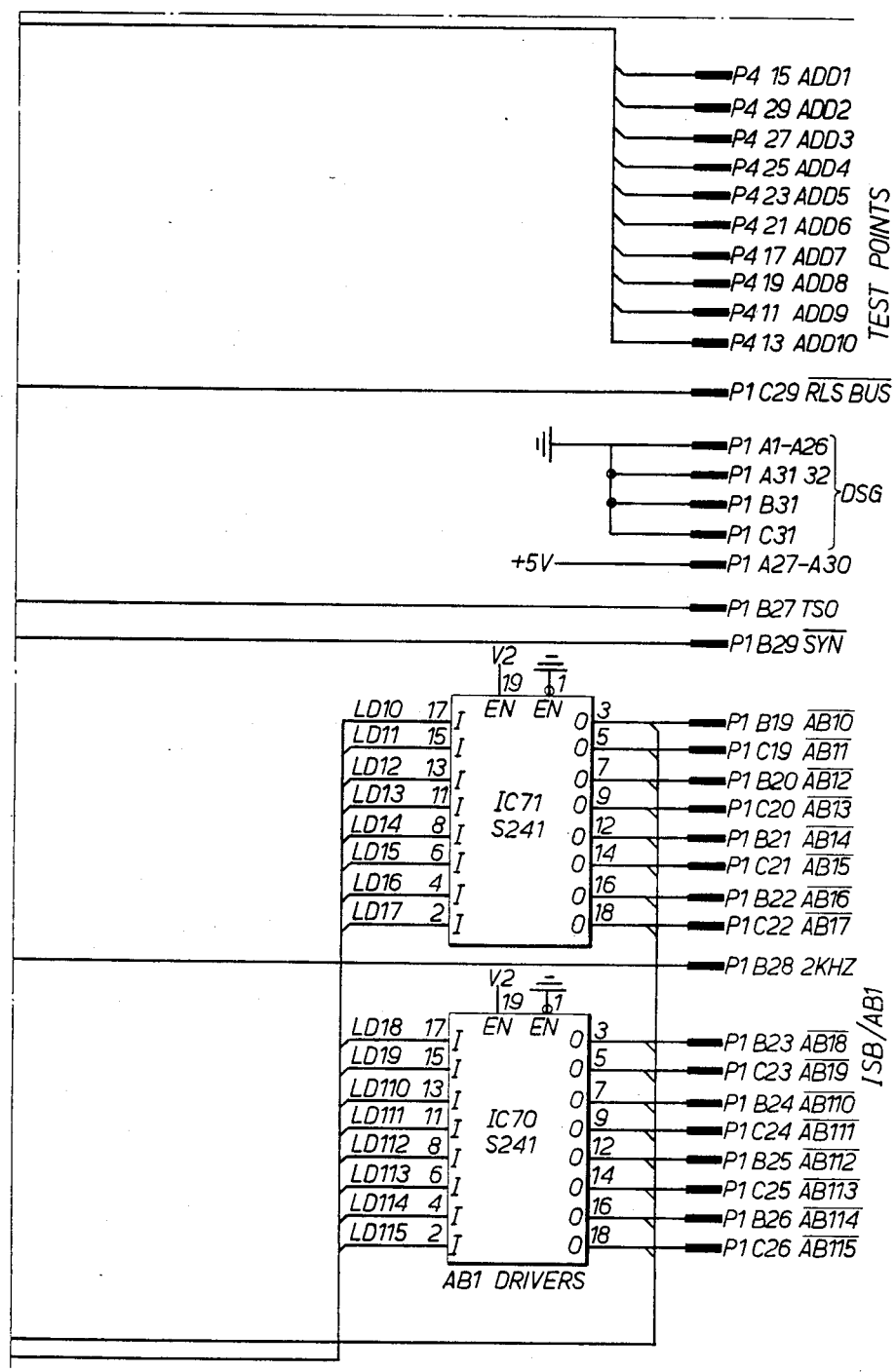
Figure 5:
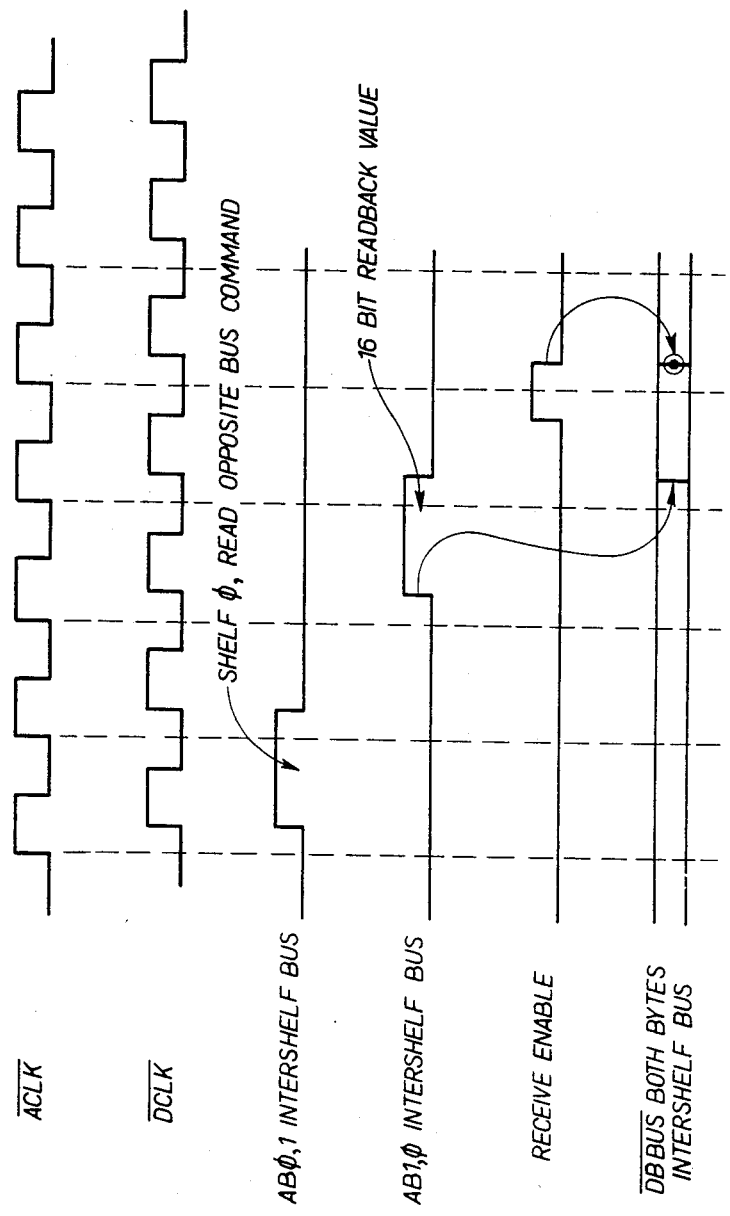
Figure 6:
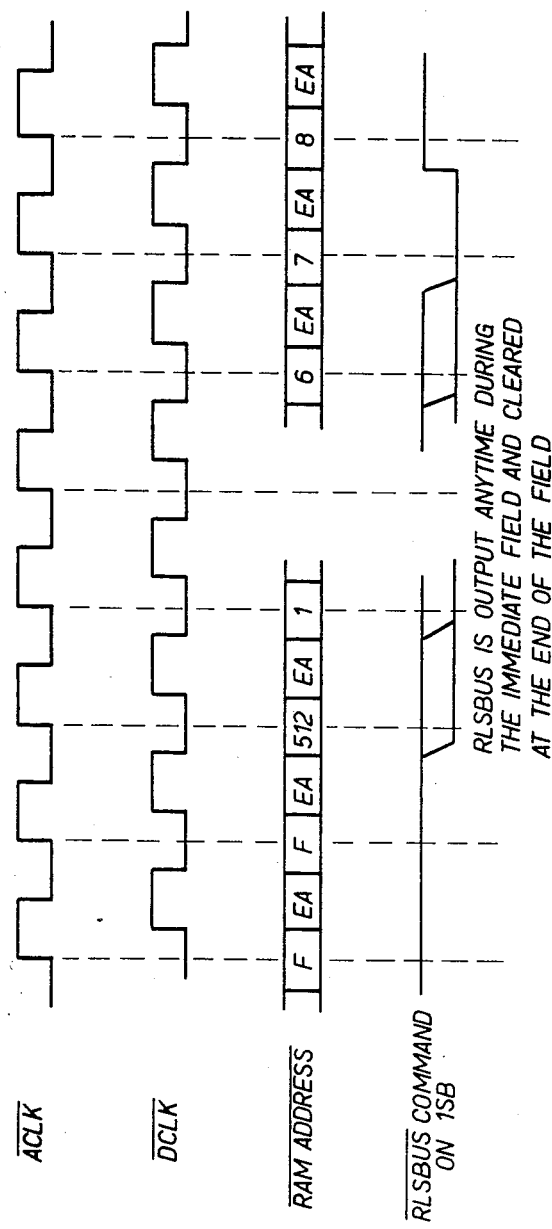
Figure 7:
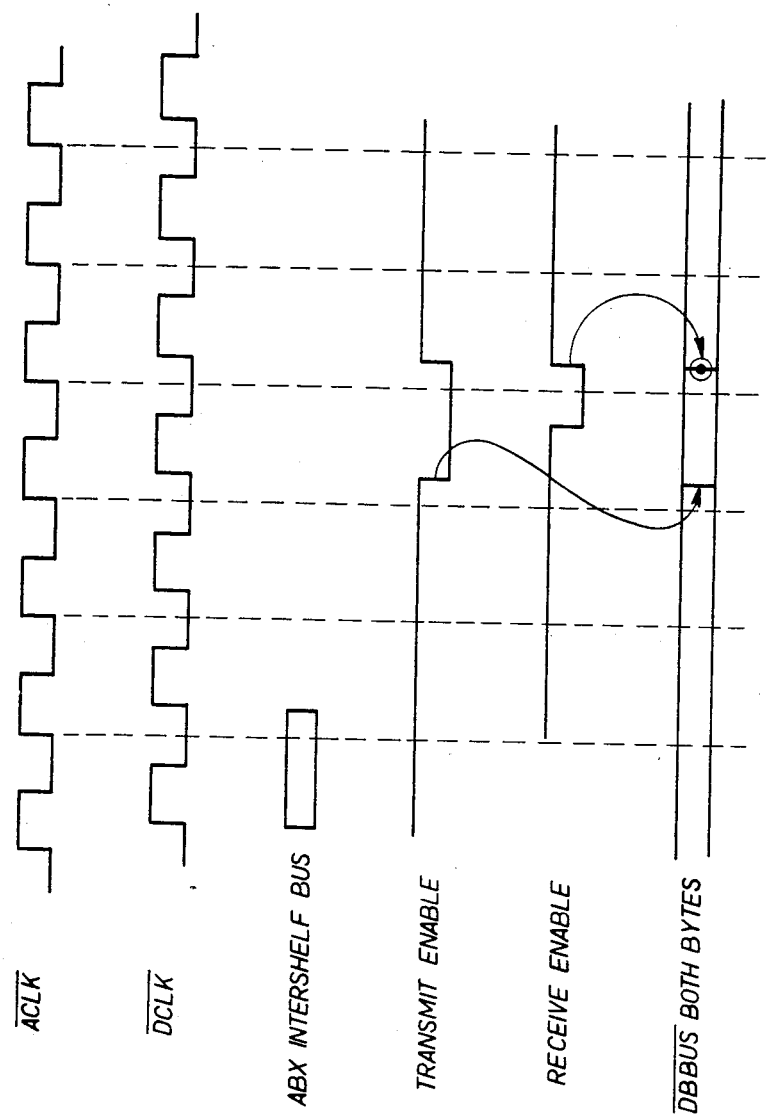
Figure 8:
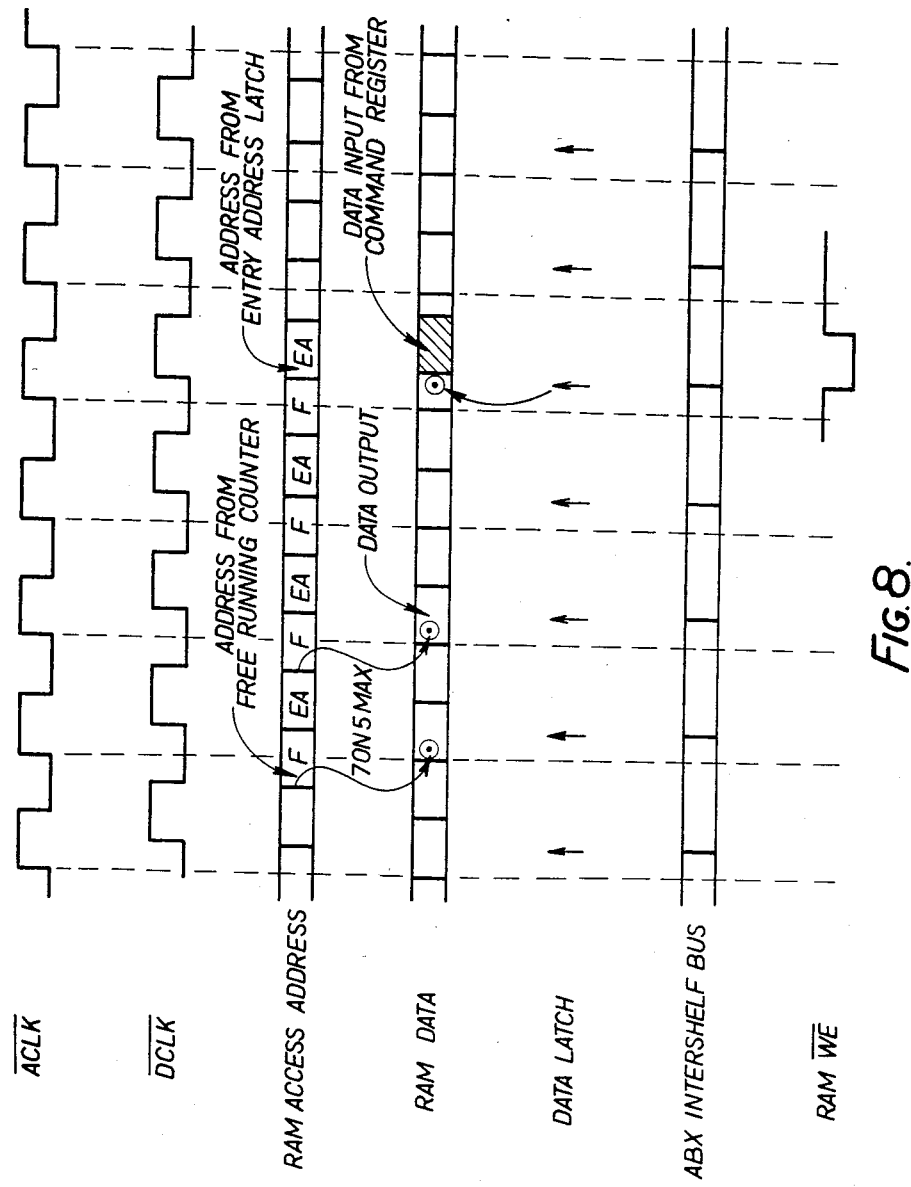
Figure 9:
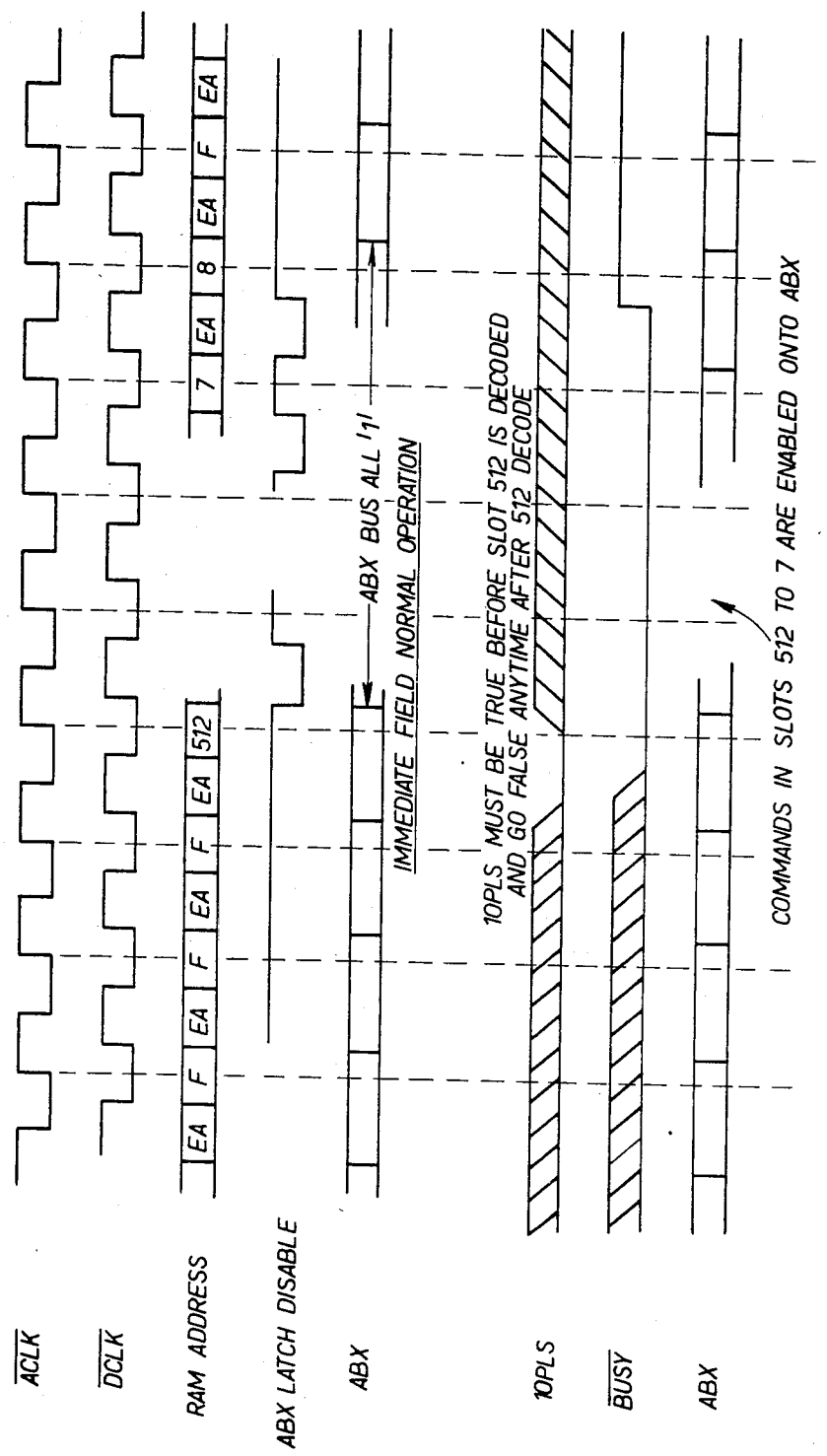
Figure 10:
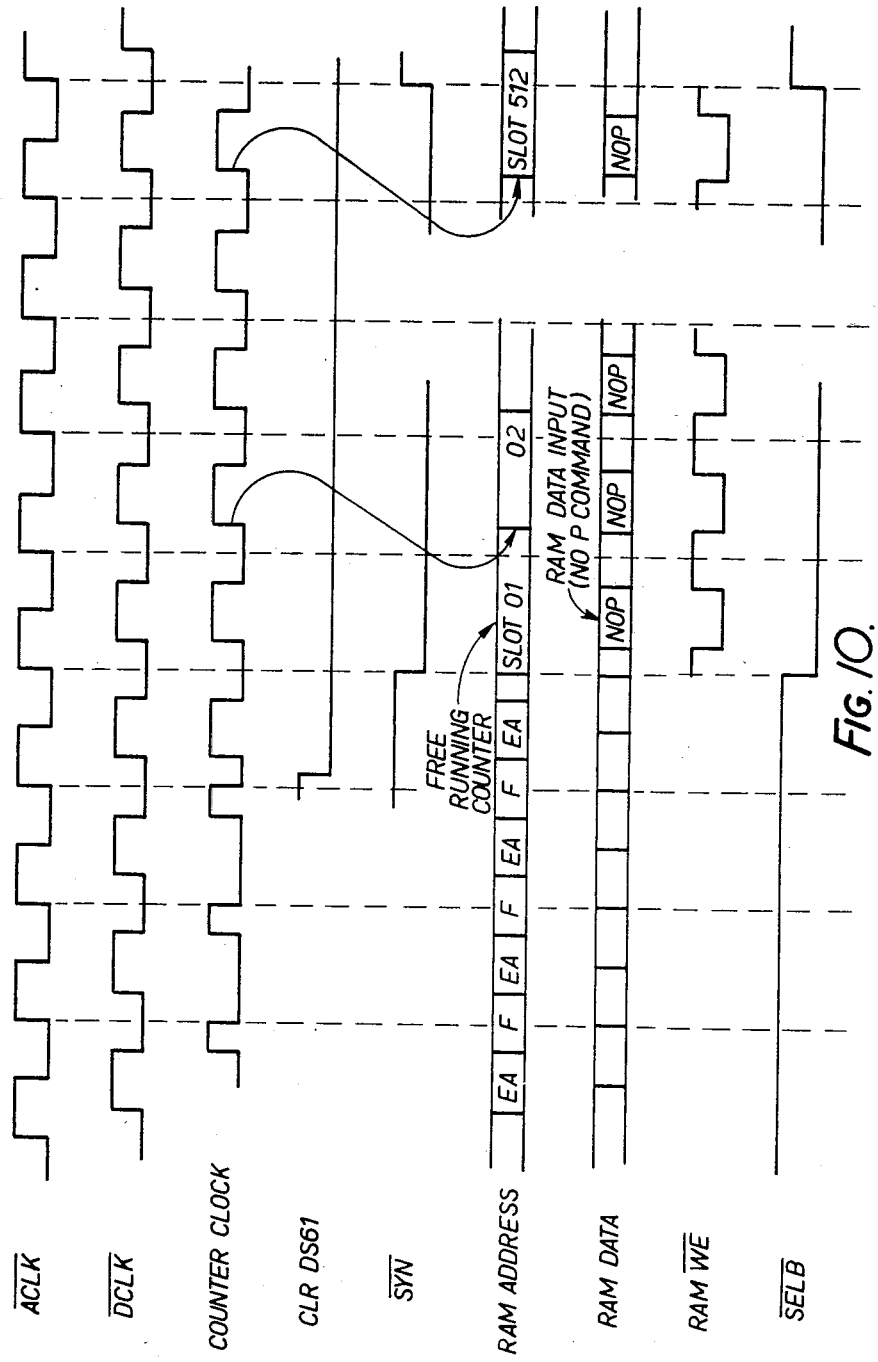
Figure 11:
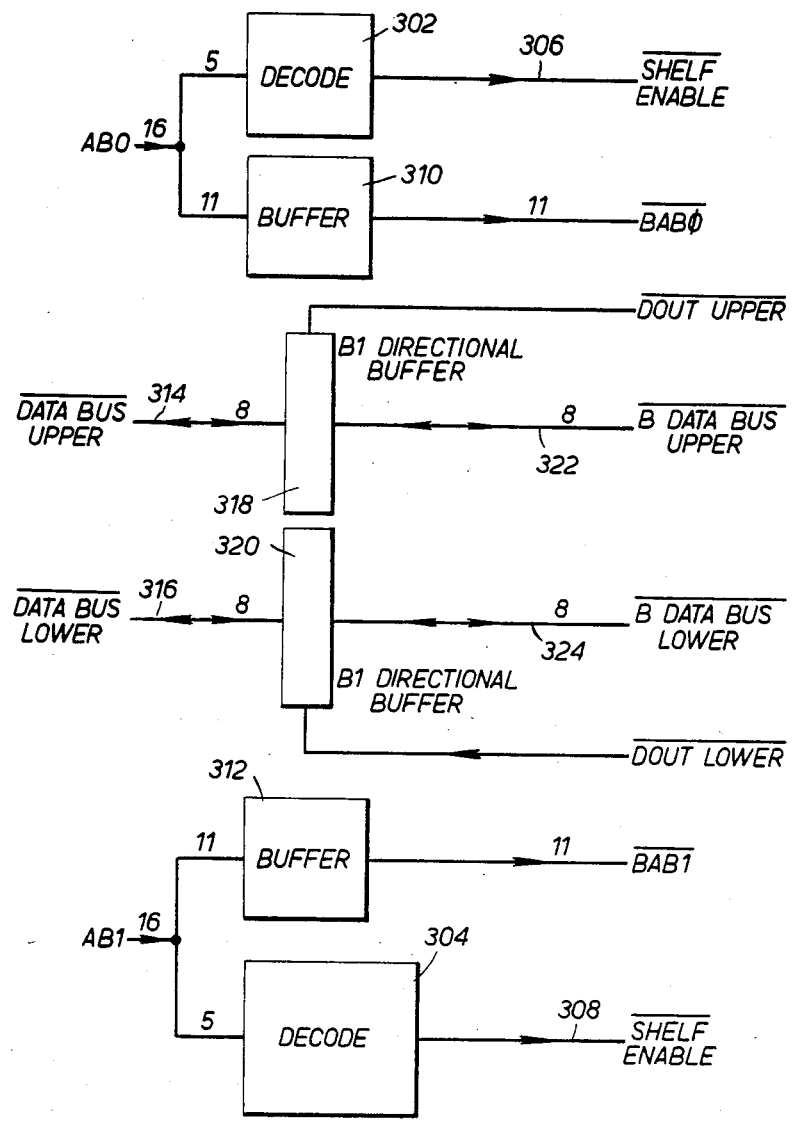
Figure 12:
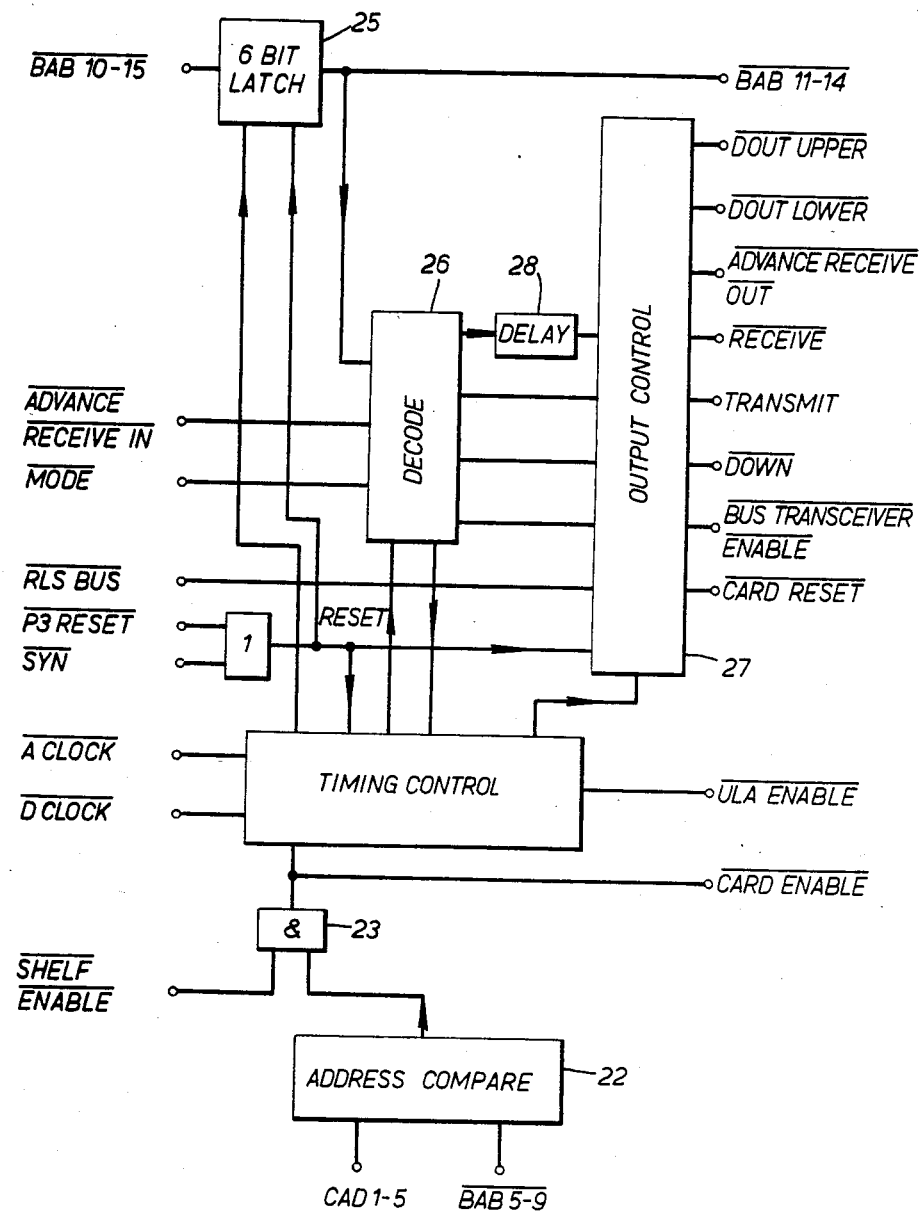
Figure 13A:
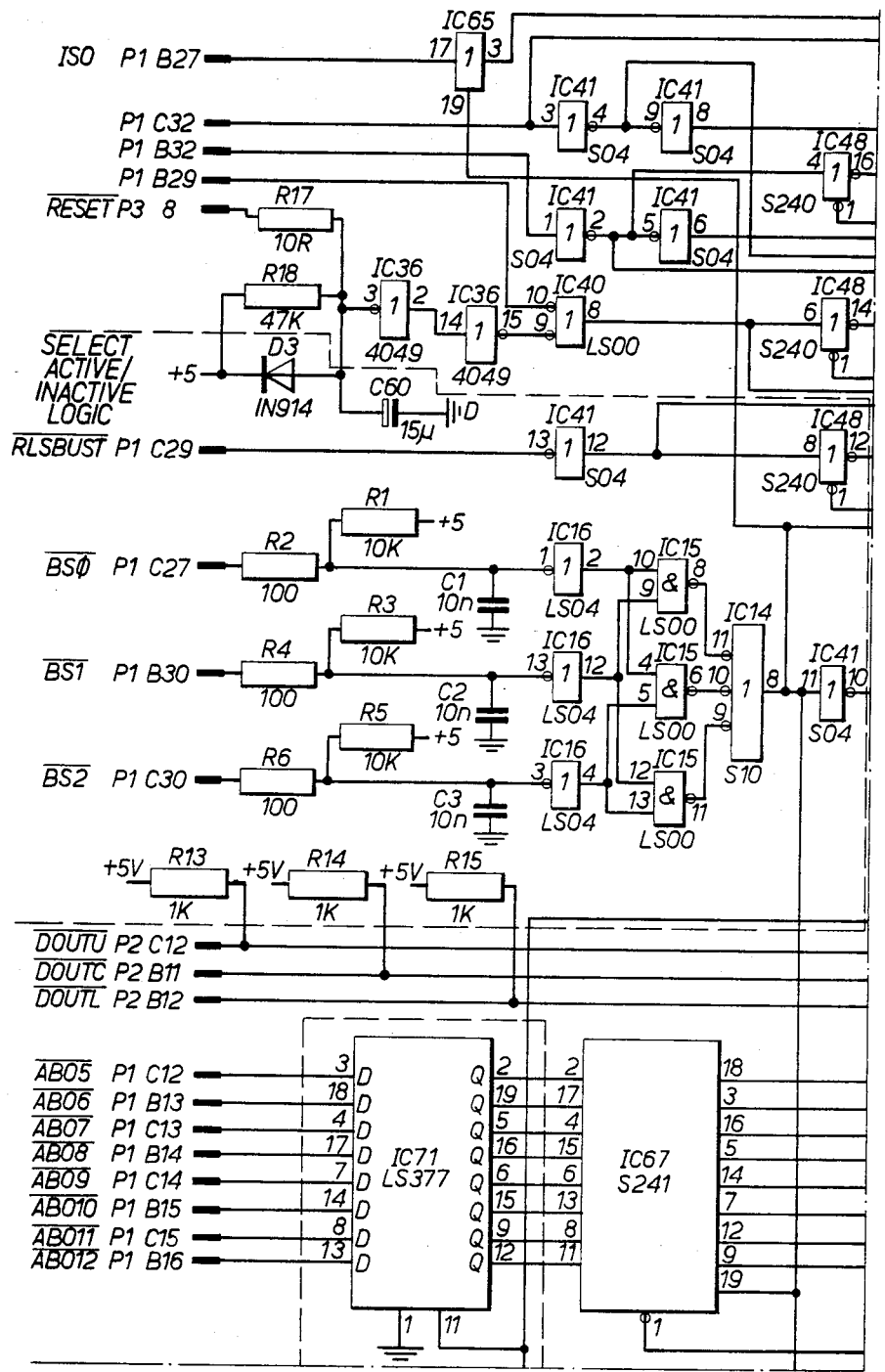
FIG. 13, shows the circuit of FIG. 12 in greater detail.
Figure 13B:
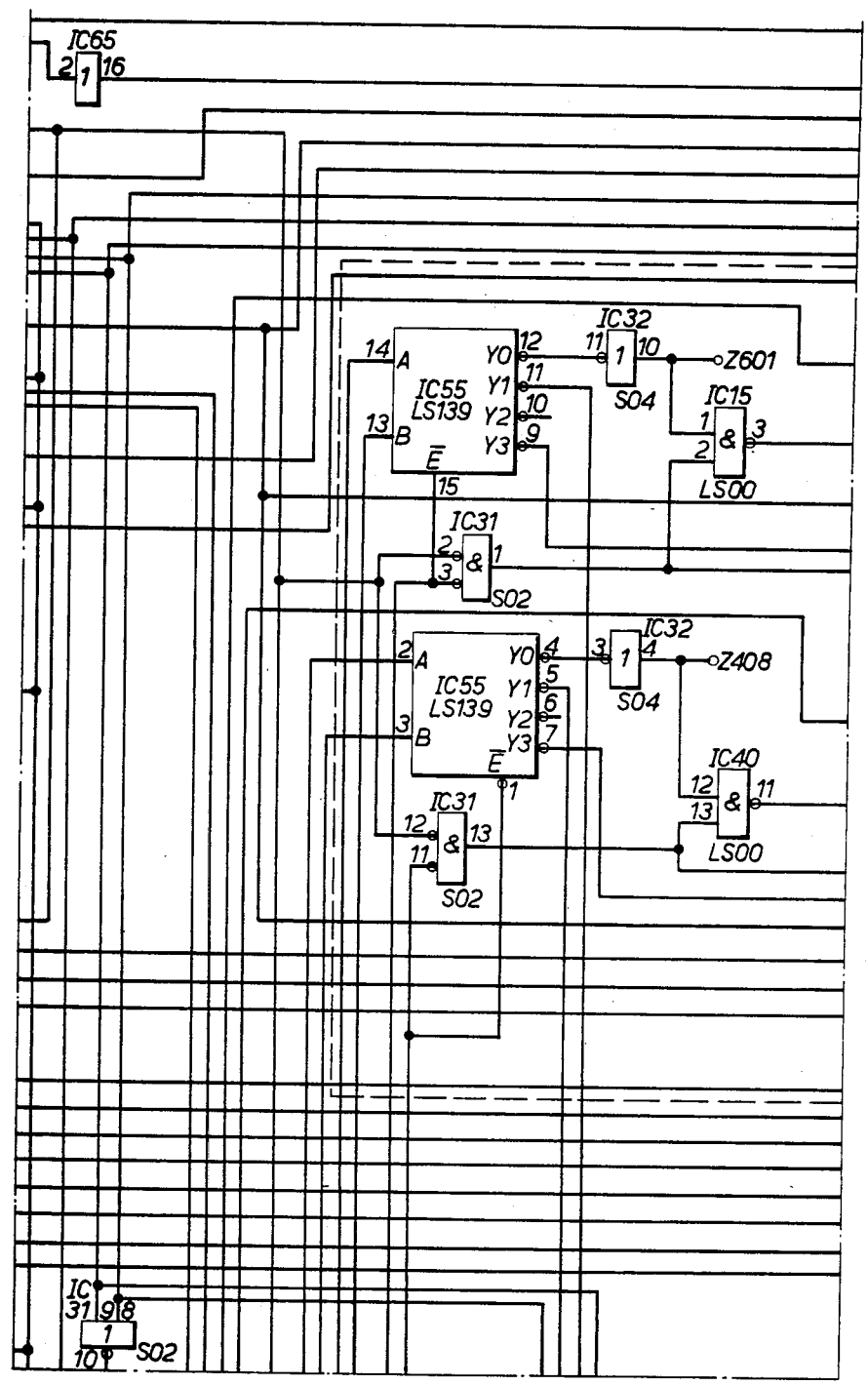
Figure 13C:
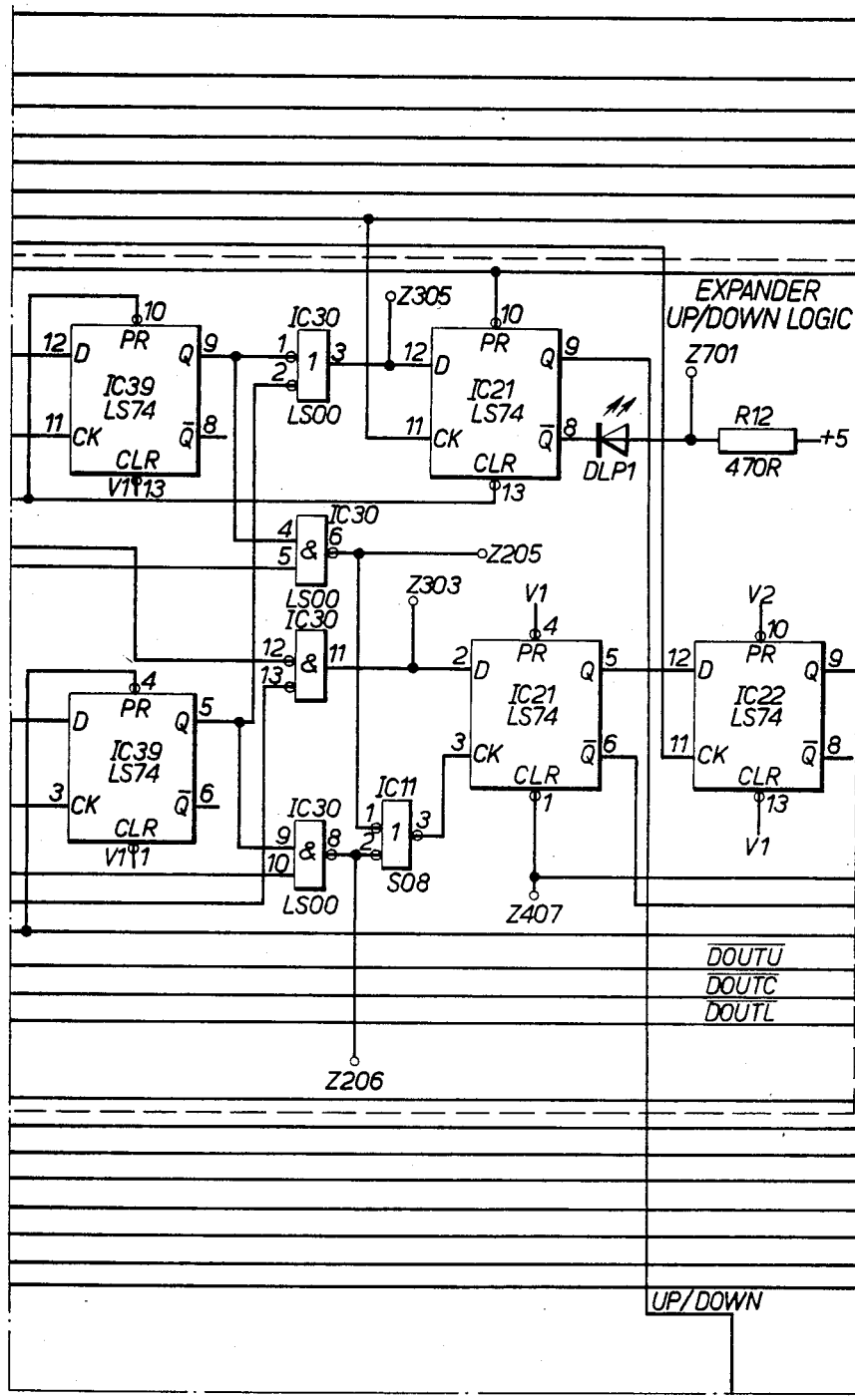
Figure 13D:
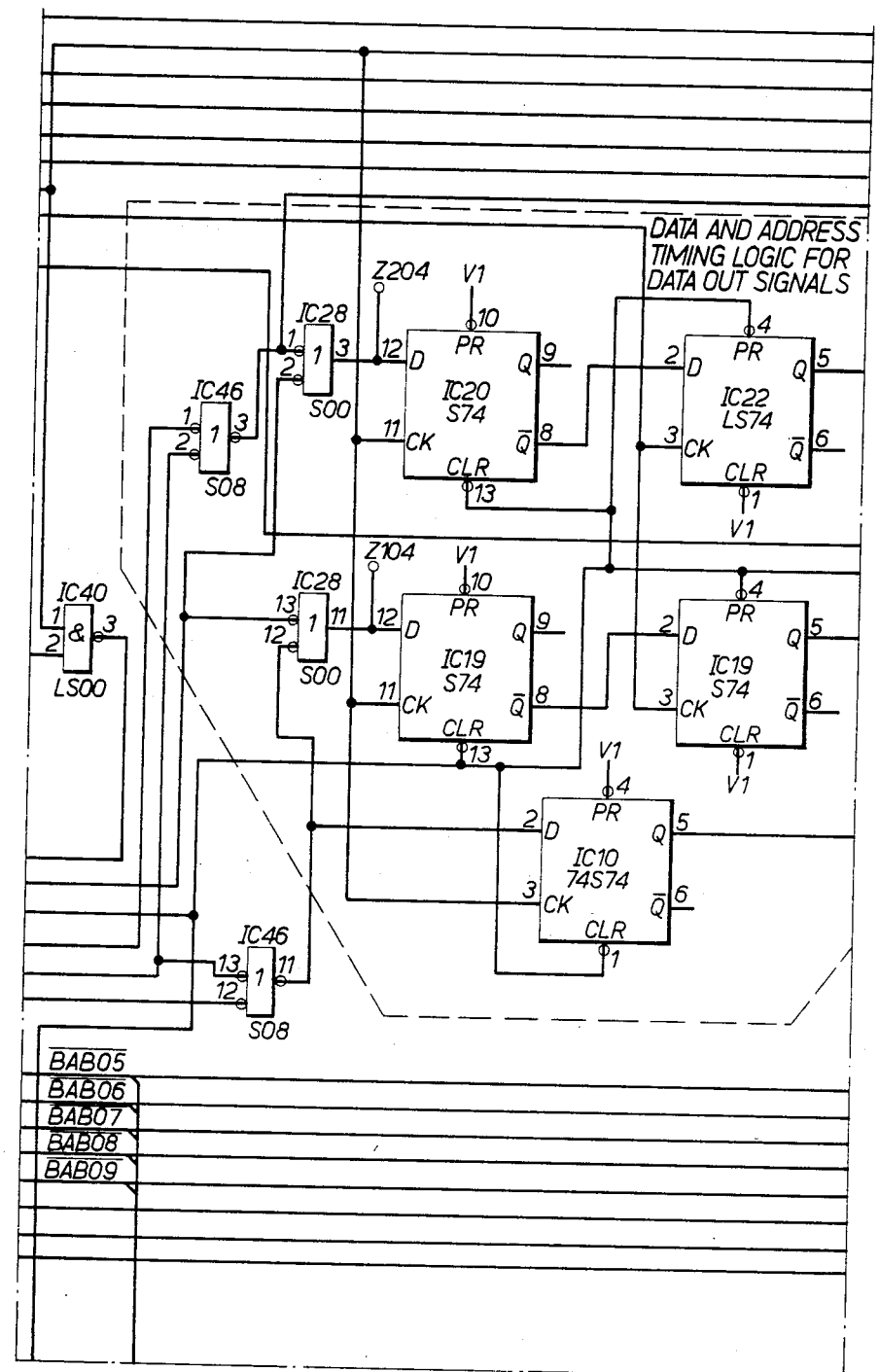
Figure 13E:
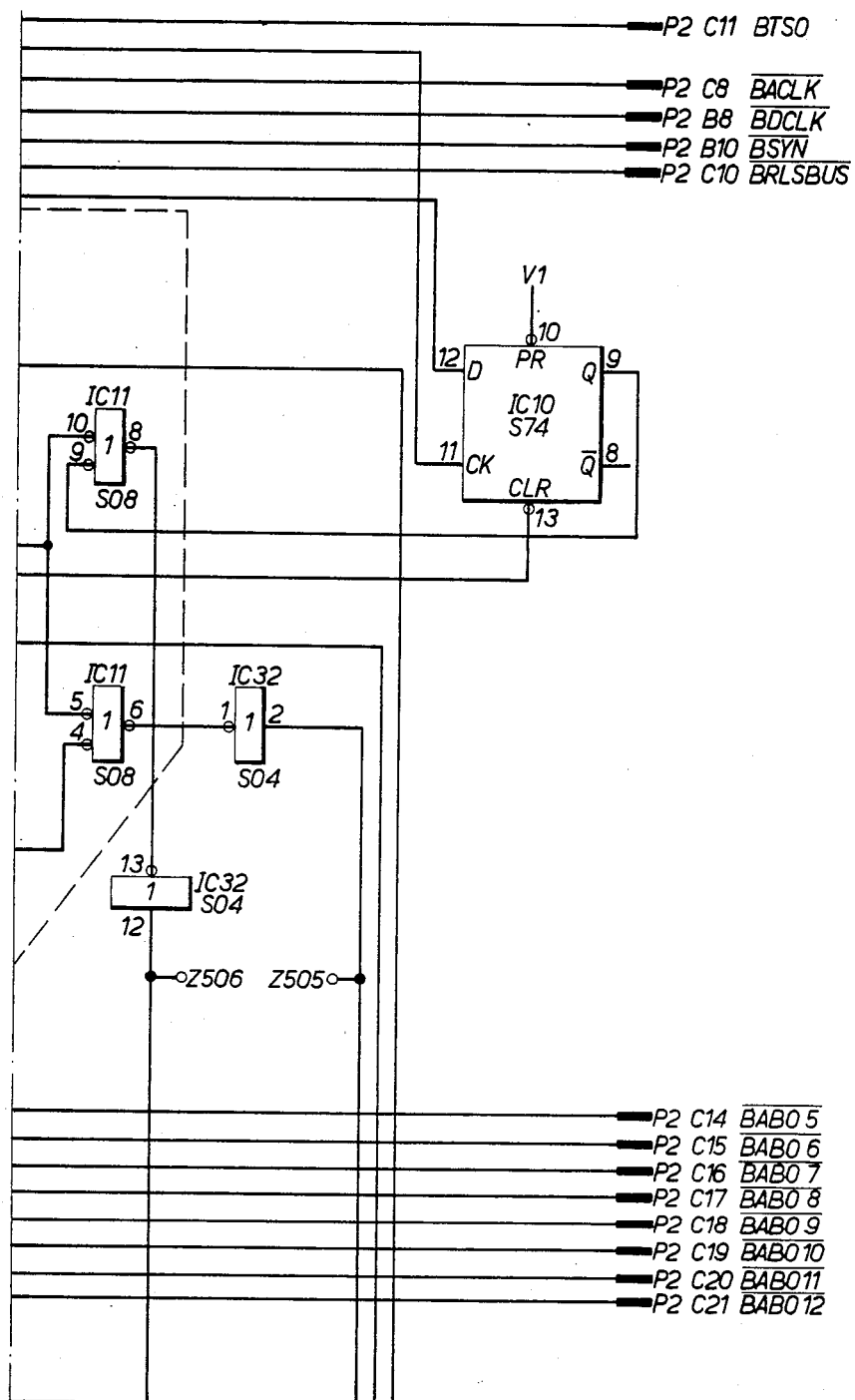
Figure 13F:
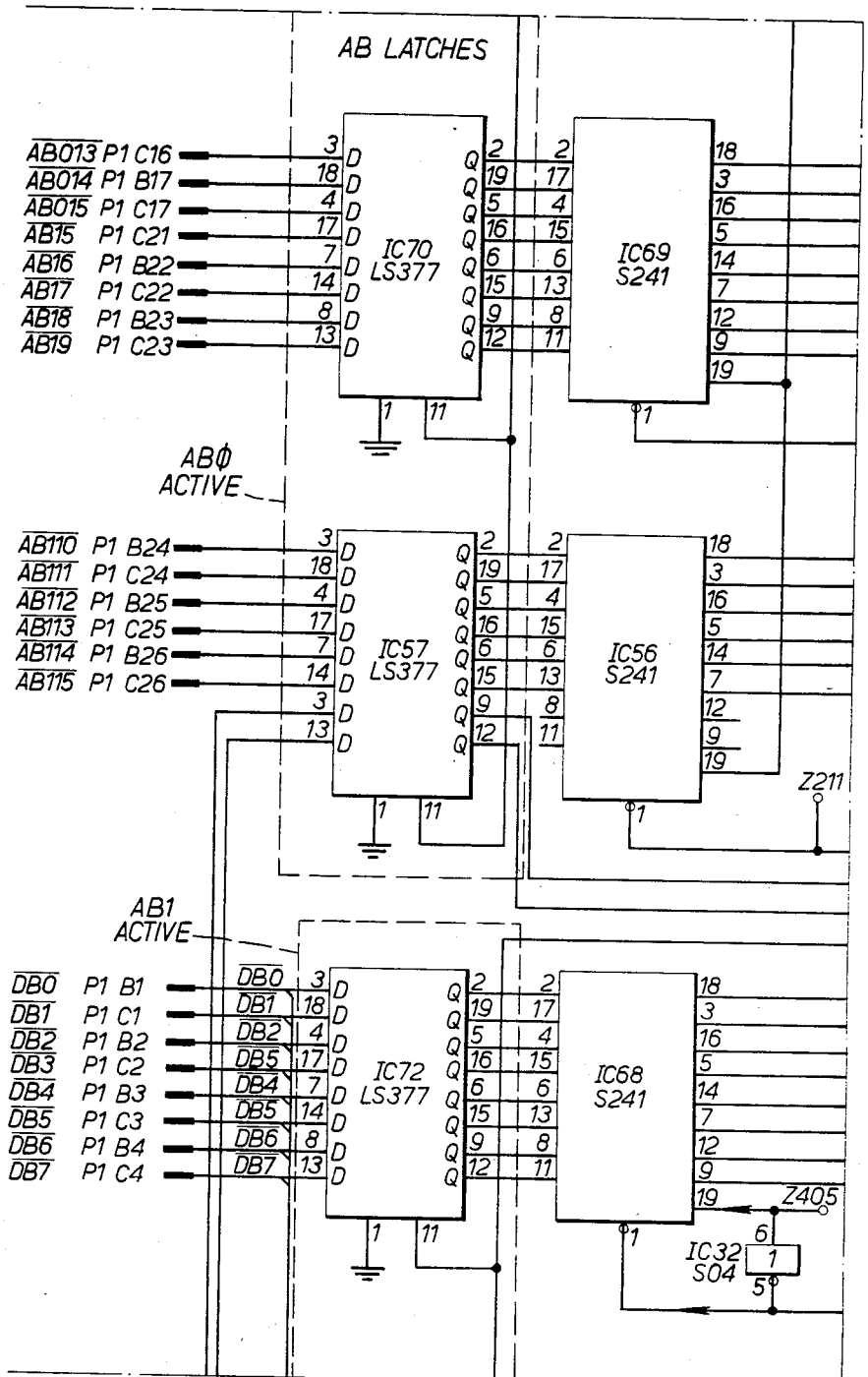
Figure 13G:
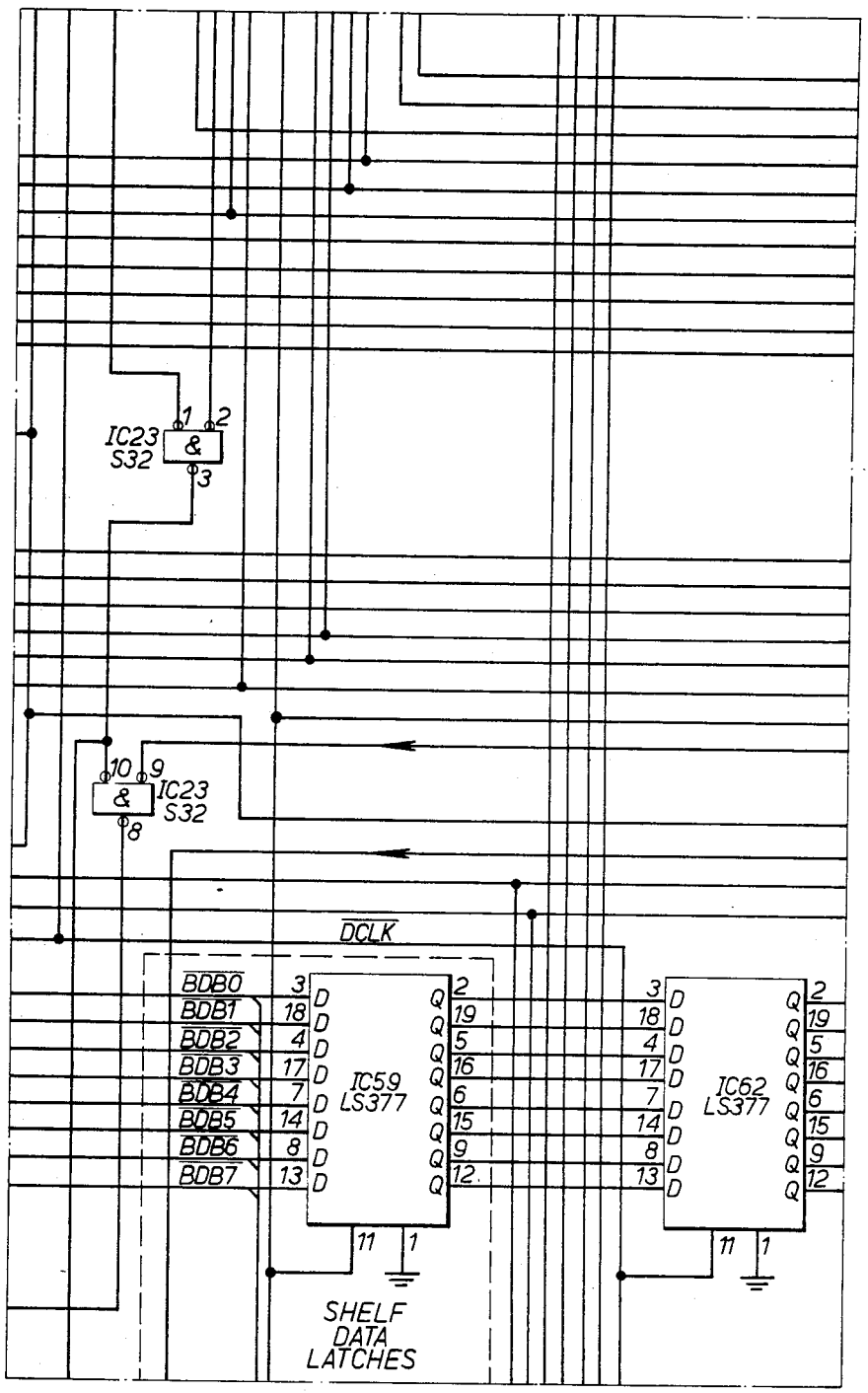
Figure 13H:
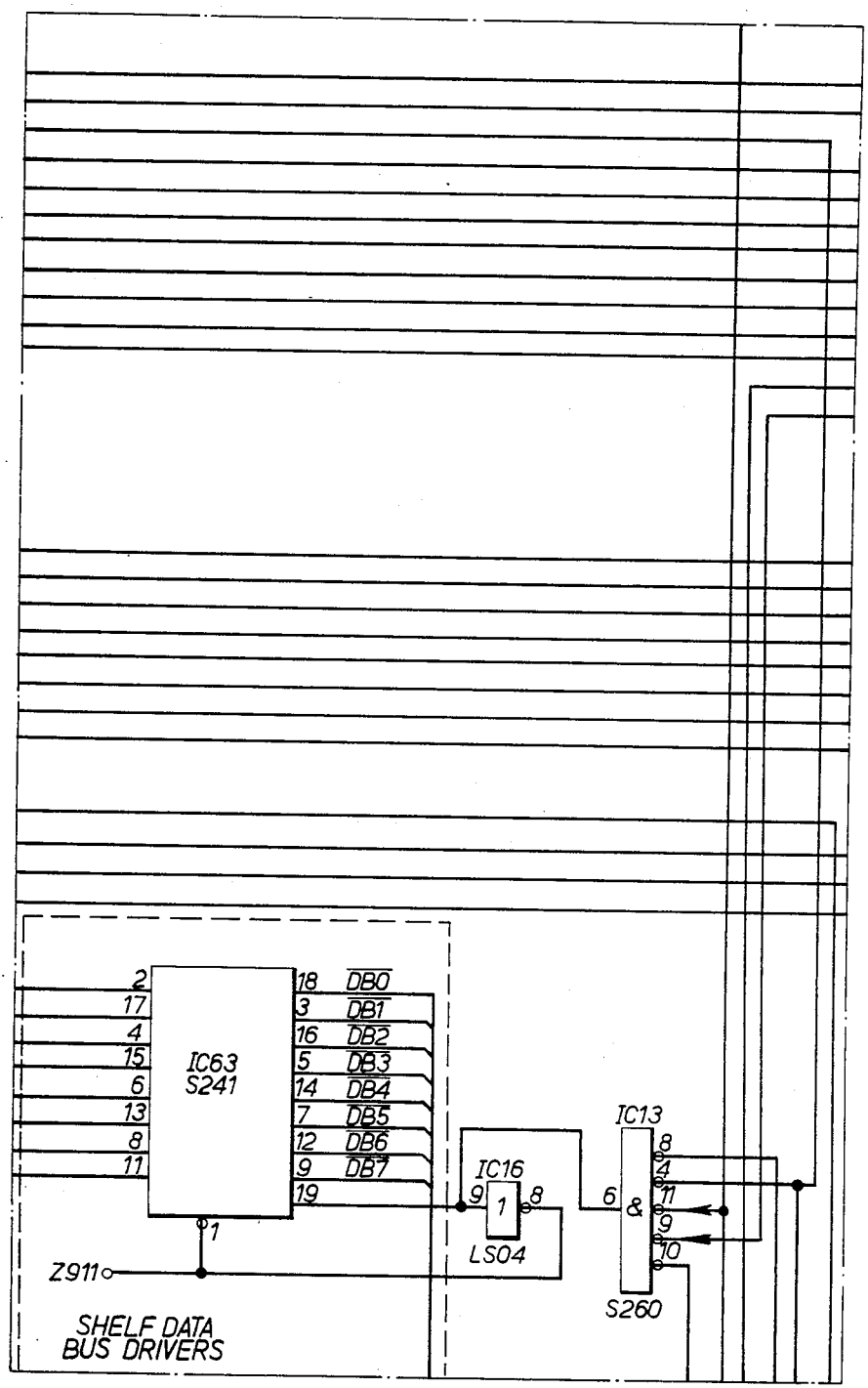
Figure 131:
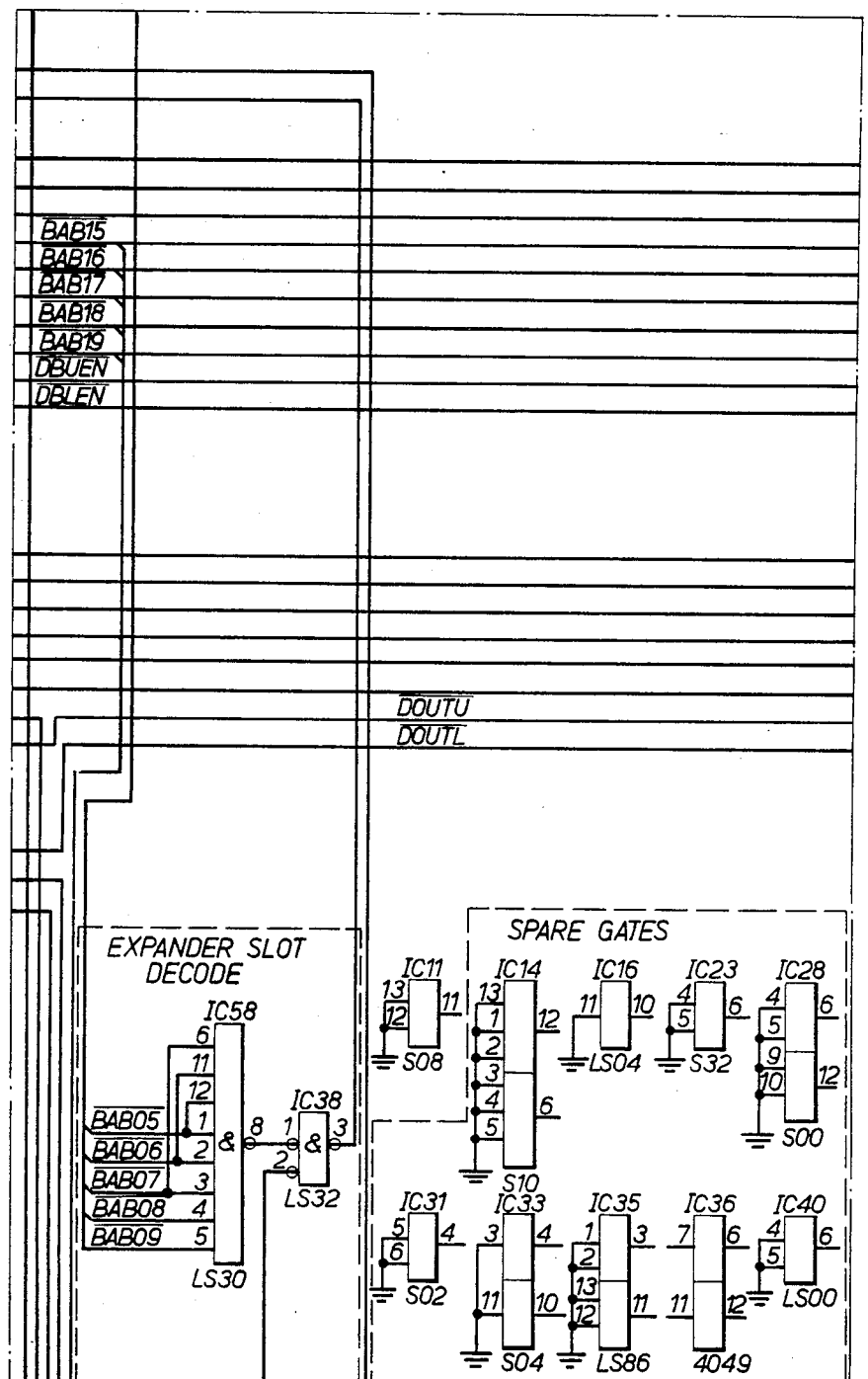
Figure 13J:
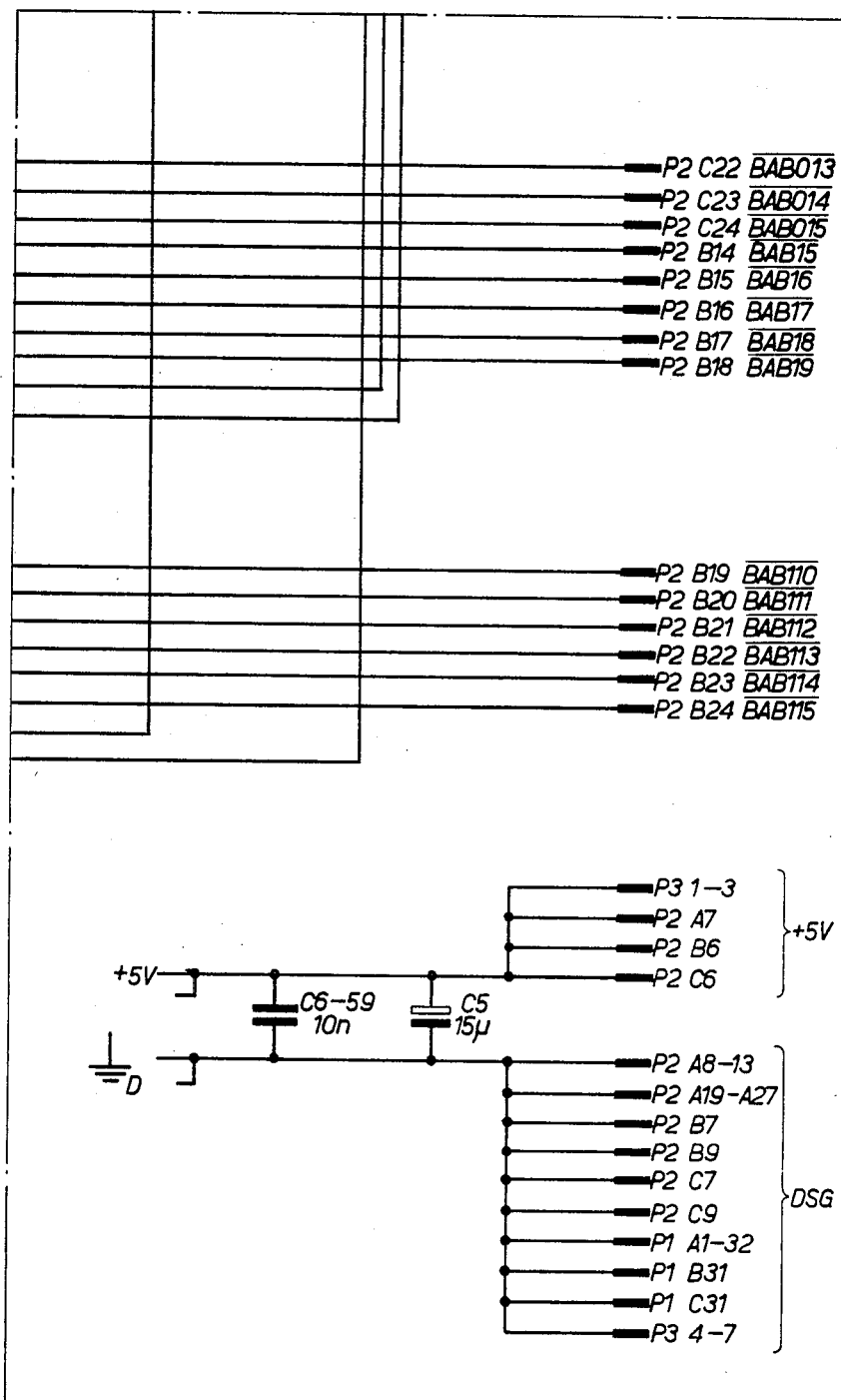
Figure 13L:
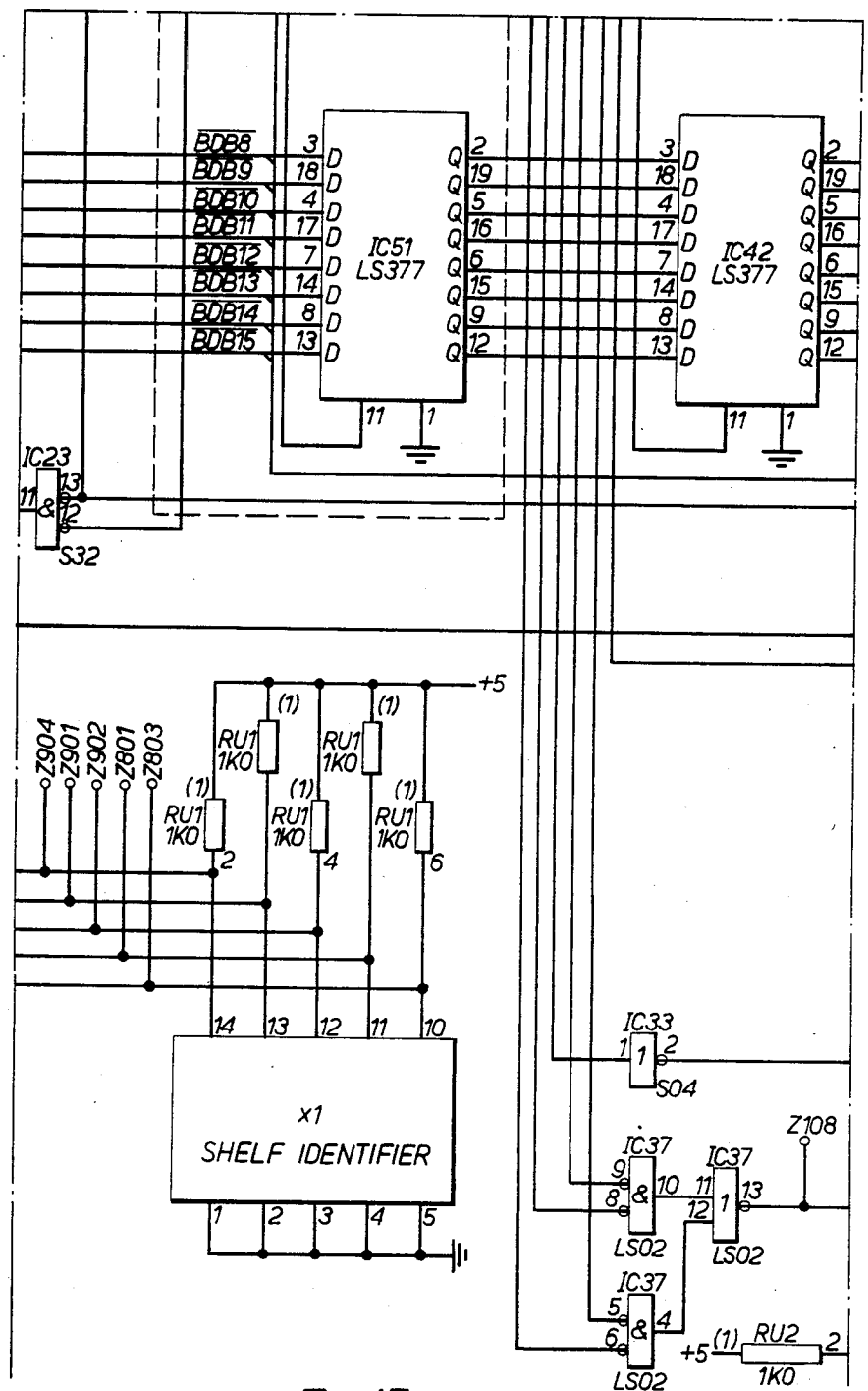
Figure 13M:
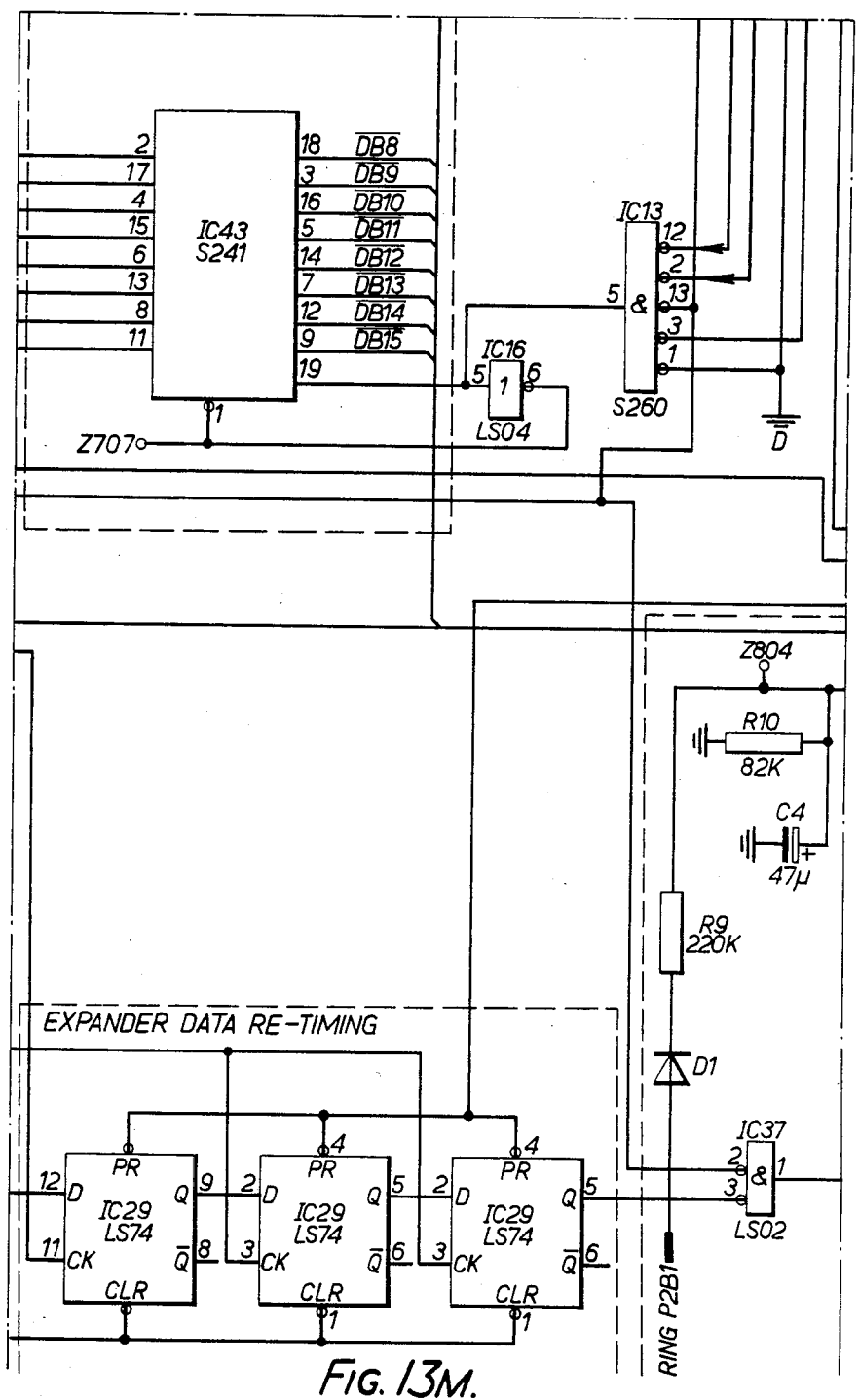
Figure 13N:
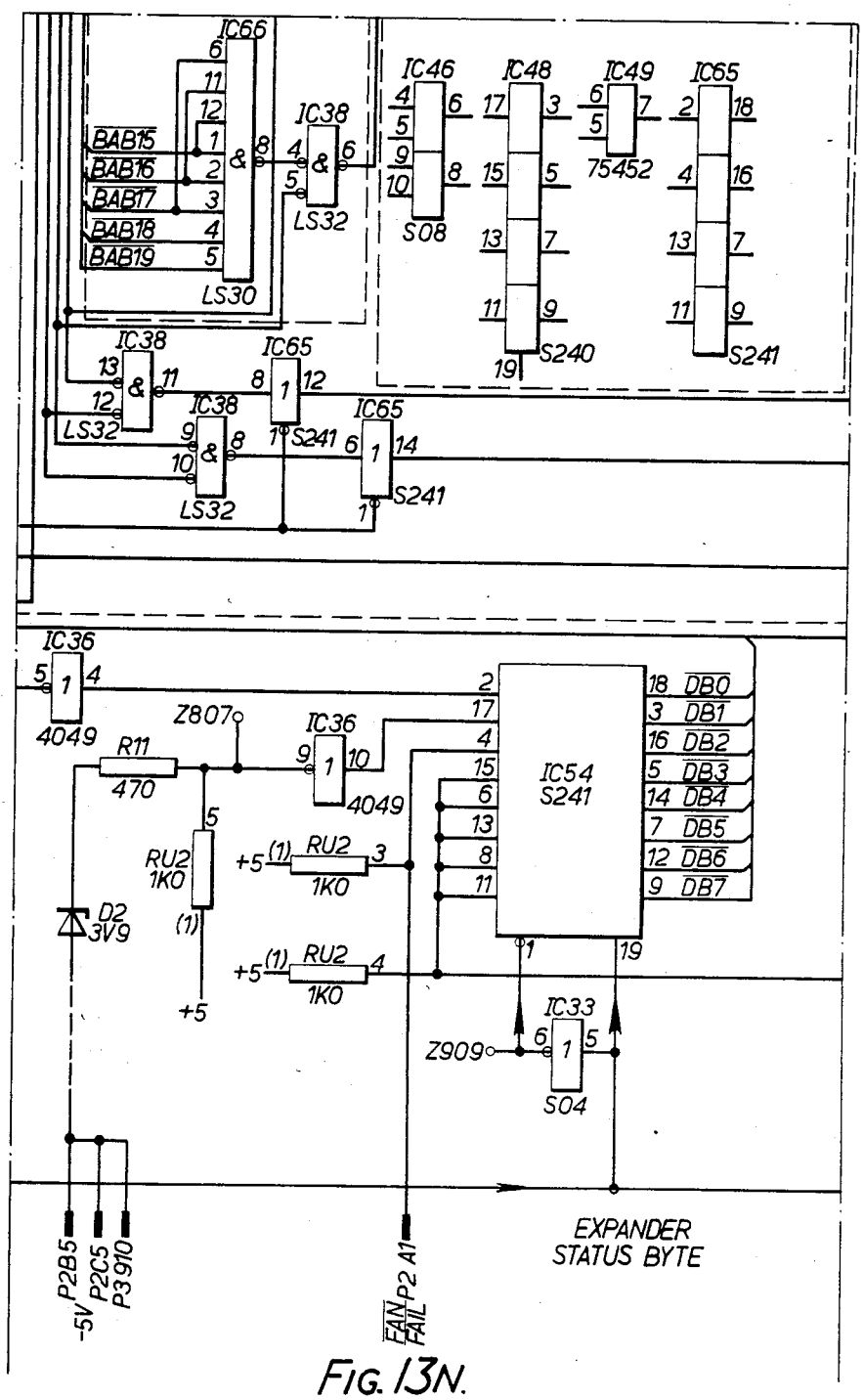
Figure 130:
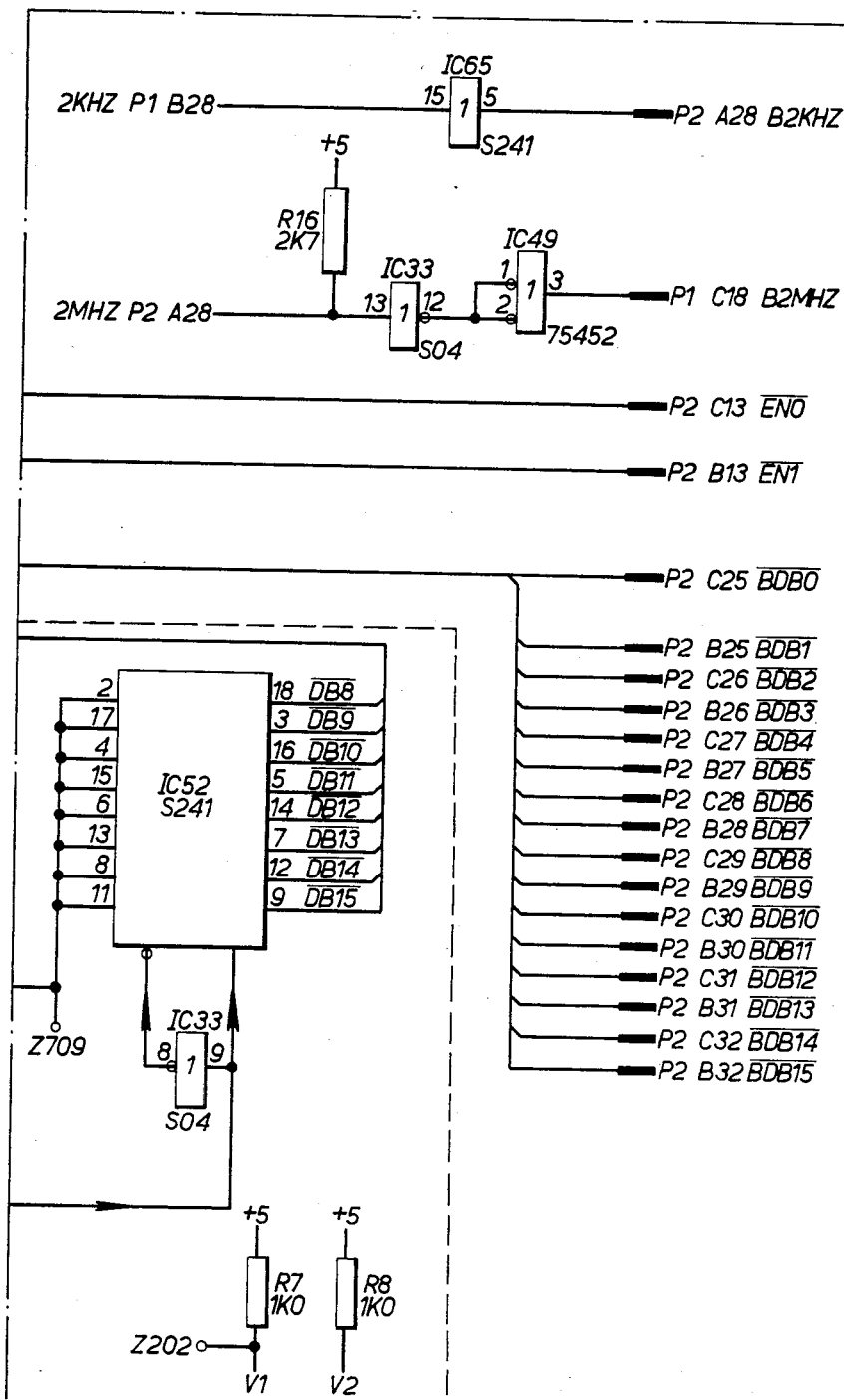
Figure 14:
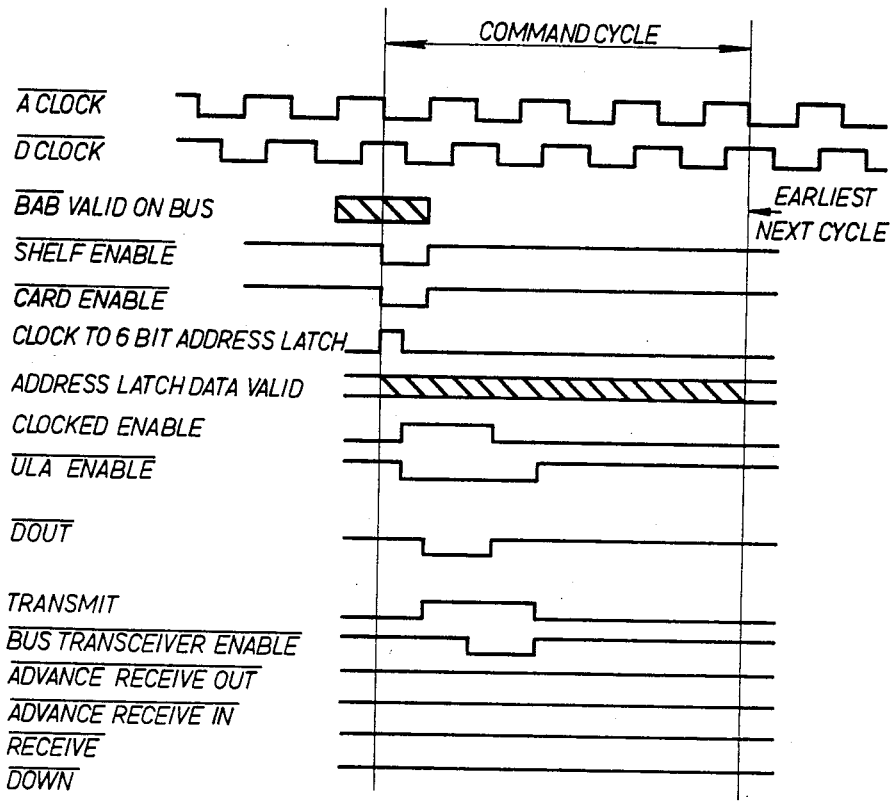
FIGS. 14 to 19 show timing diagrams associated with the circuit of FIGS. 12 and 13 and, FIG. 20 shows a command structure table according to the present invention.
Figure 15:
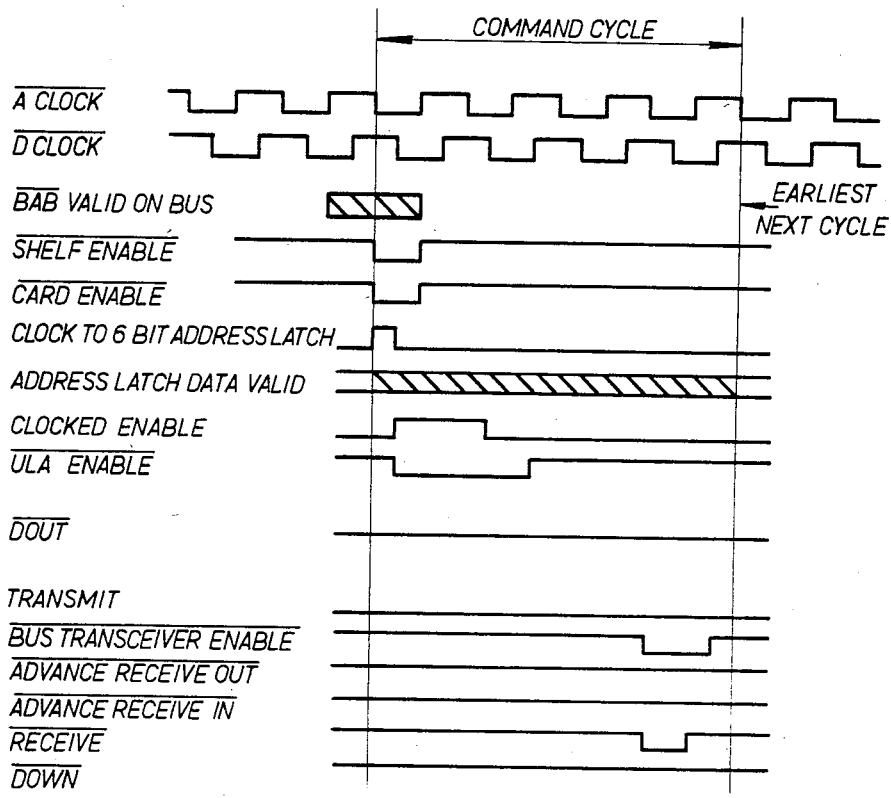
Figure 16:
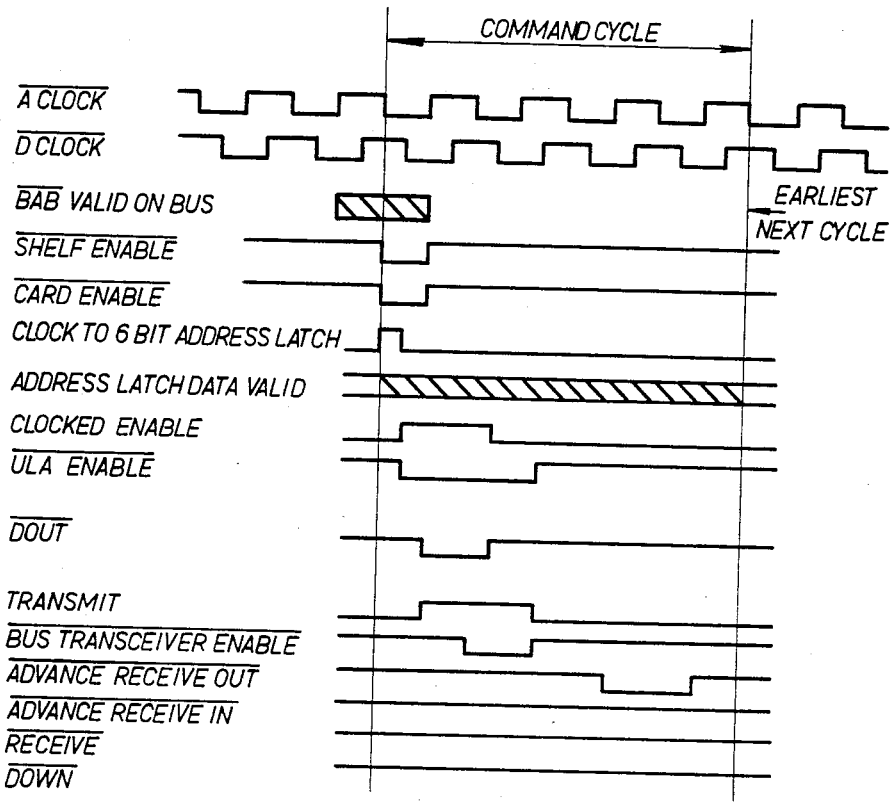
Figure 17:
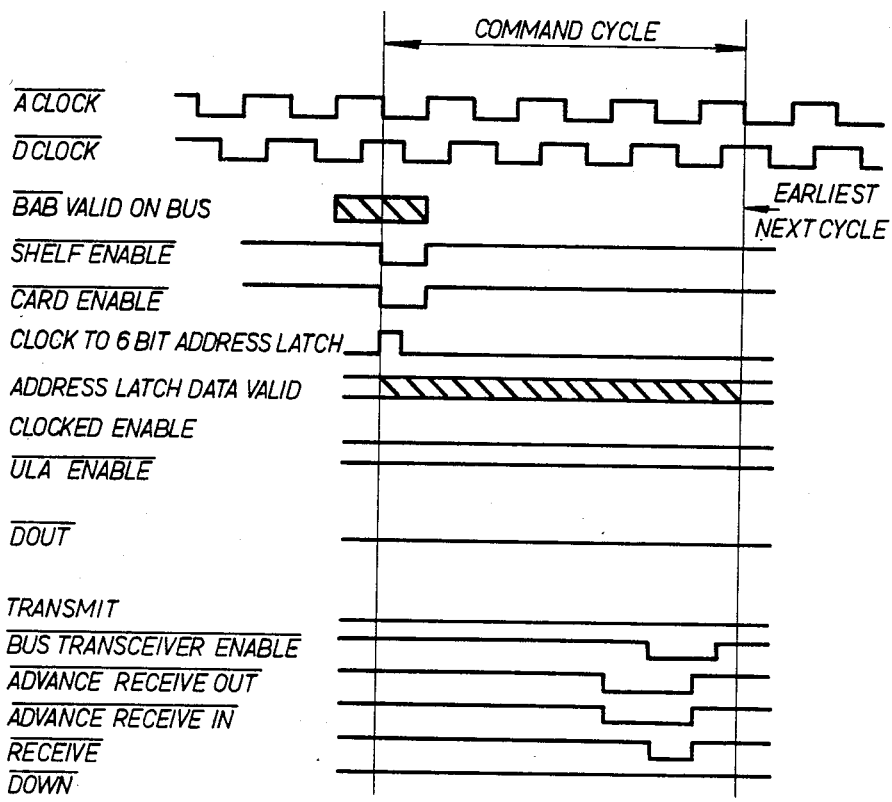
Figure 18:
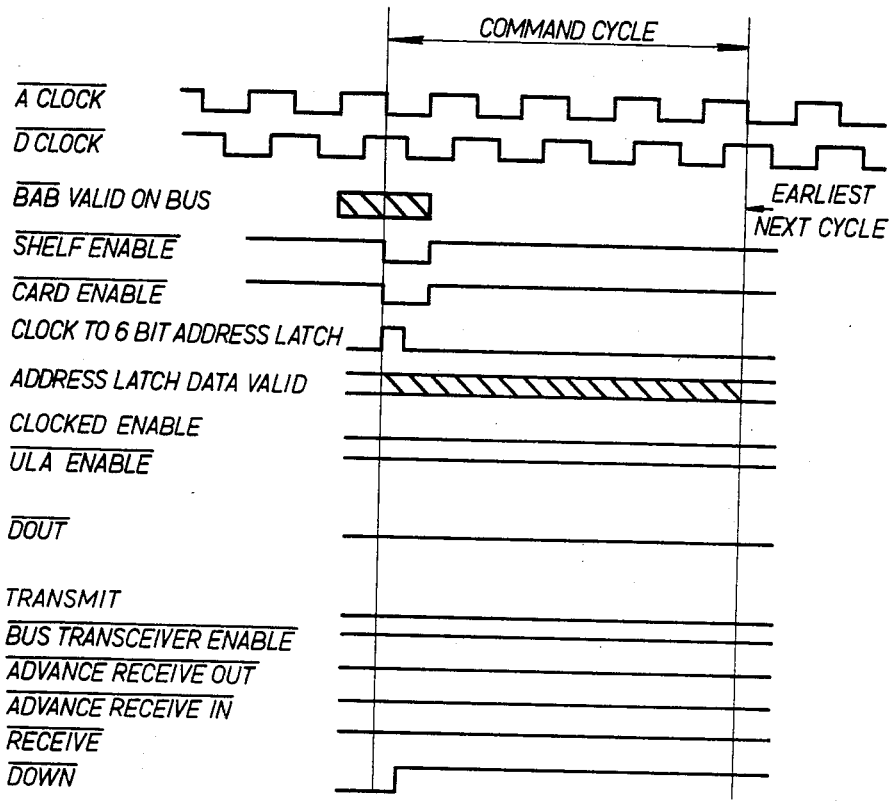
Figure 19:
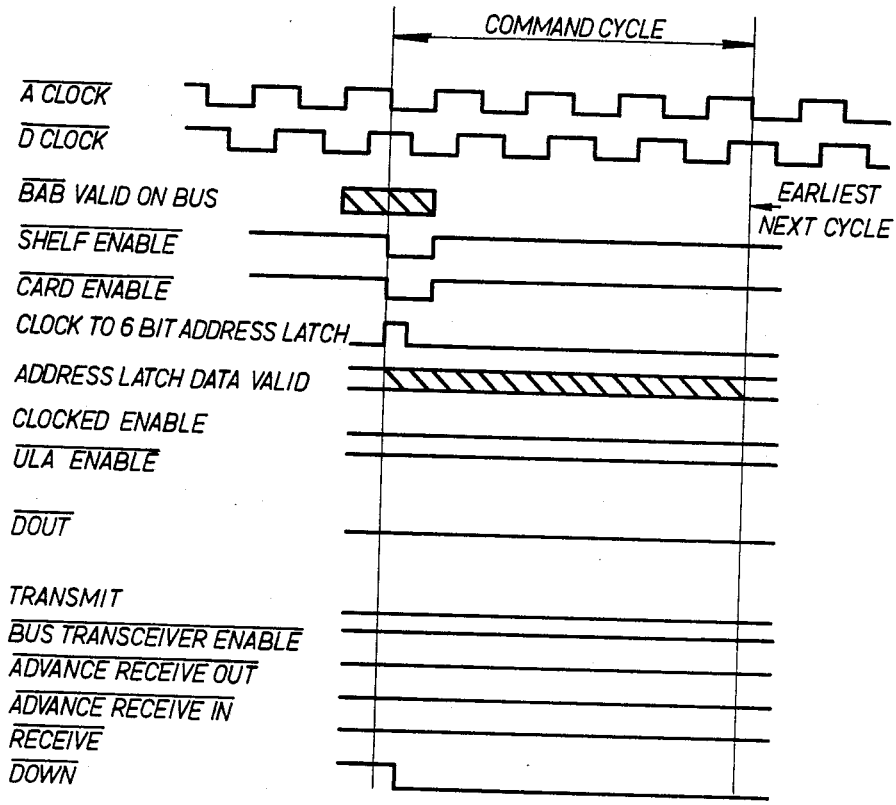

With reference to FIG. 12 the interface circuit comprises an address comparator 22 connected via an AND gate 3 to a timing control circuit 24 which selectively controls the operation of a latching circuit 25, a decoding circuit 26 and an output controller 27.

The interface circuit as shown in FIGS. 12 and 13 is preferably constructed as an uncommitted logic array (ULA) and will be referred to as such for purposes of timing sequences.

The card address contained in the address word (bits 5-9) is compared in comparator 22 to the hard-wired TDM motherboard card slot address (CAD 1-5). If all bits match then the SHELF ENABLE initiates a command cycle via AND gate 23.

For gate economy with the ULA, 5 of the latches in the 6 bit latch 25 are "transparent" level triggered latches. The clock is CARD ENABLE gated with DCLOCK to ensure that input data is stable during the whole clock period. The other data latch has a PRESET input to ensure the card does not power up in the DOWN mode.

The command structure is as shown in the table of FIG. 20. The decode section generates the appropriate demands to the output control section.

The MODE pin is normally hard wired to a specific logic function depending on the function of the associated cards. The MODE pin, when high, permits an extra transmit pulse to be generated during a receive cycle for codec applications, codecs being used to convert analogue signals for use by the telephone subscribers.

When the MODE pin is low, it effectively connects ADVANCE RECEIVE OUT to ADVANCE RECEIVE IN internally. No output is produced from ADVANCE RECEIVE OUT.

A two time slot delay is introduced by delay 28 for generation of the receive pulse at the correct time.

For a codec of a telephony group, two ULA's are required. The transceive command given to either ULA generates a TRANSMIT pulse and a RECEIVE pulse. However, the RECEIVE is required from the other ULA to control the other half of the data bus for the receive data. To achieve this, the ADVANCE RECEIVE OUT and ADVANCE RECEIVE IN are cross coupled between the two ULA's. The MODE pin on each ULA is set high.

On single ULA applications, the MODE pin is set low which effectively gates together ADVANCE RECEIVE OUT and ADVANCE RECEIVE IN internally.

UP and DOWN commands are fully decoded from all six address bits (10-15) and a single bit latch in output control 27 is set accordingly.

In the DOWN state no outputs other than CARD ENABLE, DOWN and BAB11-15 will occur if other commands are given. Only P3 RESET, SYN or UP command will restore the logic.

All timing is initiated by appropriate edges of ACLOCK and DCLOCK. To minimise delay in parts of the circuit, the clocks are buffered to the non critical areas inside the ULA. The "fast" clocks are denoted with an asterisk and are fed directly without buffering On receipt of CARD ENABLE, the timing control produces two enables and a clock.

The clock is a combination of CARD ENABLE and DCLOCK for the 6 bit latch as hereinbefore described.

The enables are:

(a) CLOCKED ENABLE. As the output from the 6 bit latch 5 does not change until the next command, CLOCKED ENABLE allows only one ADVANCE RECEIVE OUT pulse to be generated if AB15 is high or DOUT if AB15 is low. Command DOUT tells the shelf interface in FIG. 1 to drive out or to receive information. DOUT can be common or DOUT upper or DOUT lower. If DOUT upper is selected, information is only transmitted on the upper portion of the highway and vice versa if DOUT lower is selected, information is only transmitted on the lower portion of the highway.

(b) ULA ENABLE. This is CARD ENABLE stretched to 1½ D Clocks long. It indicates that the ULA is about to initiate a transmit or receive cycle.

The output control 27 gates together the output demands from the decode section and the timing control signals.

(a) DOUT

A ¾ clock pulse initiated by CLOCKED ENABLE and TRANSMIT DEMAND to prepare the shelf interface card for data reception. Open collector output is used for commoning with the other cards on the shelf.

(b) ADVANCE RECEIVE OUT

Receive pulse command delayed by 2 clocks. One ACLOCK cycle long.

(c) RECEIVE

Generated by ADVANCE RECEIVE IN or internally gated ADVANCE RECEIVE OUT, clocked out by ACLOCK as a ½ clock pulse.

(d) ULA ENABLE

1½ D clocks long expansion of CARD ENABLE brought out for Codec card timing.

(e) DOWN

Open collector driver for DOWN light emitting diode indicator to indicate when the card is non-operational.

(f) CARD RESET

Generated by either SYN (system normalise) or P3 RESET from the umbilical connector which is used for inserting or removing a board of a telephony group.

(g) CARD ENABLE

½ clock pulse generated by SHELF ENABLE when the address bits 5-9 match the 5 bit card address (CAD 1-5).

(h) BUS TRANSCEIVER ENABLE

This controls data transfer to the common data bus, therefore delays to this signal must be minimal. This is ensured by starting and finishing the pulse with ACLK* and DCLK* with latch backup.

DCLK and DCLK* are continuously attempting to reset the Bus Transceiver Enable BTE latch and inhibit the output gate. Either DOUT, ADVANCE RECEIVE IN or ADVANCE RECEIVE OUT (with MODE set low) suppress DCLK* and DCLK for one cycle and permit ACLK* to initiate the pulse and set the BTE latch.

The next DCLK* terminates the pulse.

(i) TRANSMIT

Similar action and timing to BUS TRANSCEIVER ENABLE but only DOUT initiates the pulse together with ACLK* to start the pulse a half clock cycle earlier. This gives time to prepare data for output and sets the direction of the bus transceivers.

We claim:

1. A time division multiplex address and control system for a telecommunication exchange, said control system comprising:
   a common control computer and a time division multiplex digital switch controller;
   said exchange including:
     a plurality of shelves of telephony groups;
     a data bus; and
     a plurality of address buses;
     said data bus interconnecting said plurality of shelves for time division multiplexed data transfer between said telephony groups under control of addressing on said address buses which addressing is received by way of said time division multiplex digital switch controller from said common control computer;
   said time division multiplex digital switch controller including:
     first and second address registers for addressing on said address buses; and
     a transmit register and a receive register each connected to said data bus and accessible by said common control computer to effect data interchange between said shelves and said common control computer;
   said common control computer being arranged to address said shelves by inserting respective shelf addresses in said first and second address buses and to address said time division multiplex digital switch controller by inserting respective addressing in said first and second address buses to cause said time division multiplex switch controller to read or insert data from and to said transmit and receive registers to effect data interchange between said common control computer and said time division multiplex digital switch controller.

2. A time division multiplex address and control system as claimed in claim 1 in which the digital switch controller includes a first address memory, a second address memory and a data memory which comprises a transmit upper and a transmit lower register, in which the first and second address memories are connected to receive respective first and second address information from the common control computer, in which the transmit upper and transmit lower data registers are connected to receive data from the common control computer, in which the first and second address memories are connected to first and second intershelf buses to transmit said address information to the telecommunication exchange and in which the transmit upper and lower data registers are connected to an intershelf data bus via respective first and second data bus drivers, and in which the data bus is divided into two halves, an upper and a lower, to transmit and receive upper and lower data bytes.

3. A time division multiplex address and control system as claimed in claim 2 in which a receive register is connected to the two halves of the data bus to receive information transmitted on the data bus, in which the output of the receive register is connected to an input-/output bus driver the output of which is connected to the common control computer via a common control bus.

4. A time division multiplex address and control system as claimed in claim 3 including first and second read address buffers connected respectively to the first and second address memories to receive the address information output to said first and second intershelf address buses, the outputs of the first and second read address buffers being connected to said input/output bus driver to enable output address information to be fed back to said common control computer for checking.

5. A time division multiplex address and control system as claimed in claim 4 including first and second read back address bus circuits respectively connected to the first and second address buses to read addresses output on these buses, the outputs of the first and second read back address bus circuits being connected to the inputs of the first and second data bus drivers.

6. A time division multiplex address and control system as claimed in claim 5 in which the first and second address buses and the upper and lower data buses are connected via a plurality of shelf interface circuits to a plurality of shelves of equipment in a telecommunication exchange, in which a plurality of telephone groups of subscribers are connected to at least two of said shelves via respective interface circuits.

7. A time division multiplex address and control system as claimed in claim 6 in which each shelf interface circuit includes first and second address decode circuits, for decoding a portion of the address on each respective first and second address bus, to identify a shelf; first and second address buffers, associated with said first and second address buses, to buffer the remaining portion of each address to respective first and second shelf address buses; and including first and second bi-directional buffers connected to the upper and lower byte intershelf data buses and to the upper and lower byte shelf data buses to buffer information between the shelf and the digital switch controller.

8. A time division multiplex address and control system as claimed in claim 7 in which the telephony group interface circuits include a multibit latch circuit which receives and is actuated by a first portion of the remaining portion of the address bits, said latch circuit being connected via a decode circuit to an output control circuit, which output control circuit provides outputs to the telephony cards to control the passage of data from a selected one of said telephone subscribers to the shelf bus and subsequently to the intershelf bus, in which a second portion of the remaining portion of the address bits output from said shelf interface circuit is used to energize the appropriate telephony group interface circuit to allow only that circuit to pass data to the shelf bus.

* * * * *